United States Patent
Halliday et al.

(10) Patent No.: US 8,852,659 B2
(45) Date of Patent: *Oct. 7, 2014

(54) CARTRIDGE FOR THE PREPARATION OF BEVERAGES

(71) Applicant: Kraft Foods R & D, Inc., Munich (DE)

(72) Inventors: Andrew Halliday, Hook Norton (GB); Colin Ballard, Cheltenham (GB); Satwinder Panesar, Tullibody (GB); Geoff Rendle, Winslow (GB); Maria Gomez, West Midlands (GB)

(73) Assignee: Kraft Food R & D, Inc., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,905

(22) Filed: Nov. 30, 2012

(65) Prior Publication Data

US 2013/0164416 A1    Jun. 27, 2013

Related U.S. Application Data

(60) Continuation of application No. 13/399,423, filed on Feb. 7, 2012, now abandoned, which is a continuation of application No. 12/631,058, filed on Dec. 4, 2009, now Pat. No. 8,168,247, which is a division of application No. 10/763,680, filed on Jan. 23, 2004, now Pat. No. 7,640,843.

(60) Provisional application No. 60/462,538, filed on Apr. 11, 2003.

(30) Foreign Application Priority Data

Jan. 24, 2003  (GB) .................................. 0301702.7

(51) Int. Cl.
*B65B 29/02*    (2006.01)

(52) U.S. Cl.
USPC ............................................... 426/77; 99/295

(58) Field of Classification Search
USPC ............................................... 99/295; 426/77
See application file for complete search history.

(56) References Cited

U.S. PATENT DOCUMENTS

| 324,049 A | 8/1885 | Thew |
|---|---|---|
| 1,230,091 A | 6/1917 | Kitchen |

(Continued)

FOREIGN PATENT DOCUMENTS

| EP | 0057671 | 8/1982 |
|---|---|---|
| EP | 0151252 | 8/1985 |

(Continued)

OTHER PUBLICATIONS

Gaggia, Company History, [online], Apr. 2011 [retrieved on Apr. 28, 2011]. Retrieved from the Internet< URL: http://www.gaggia.com/storia_espressoasp>.

(Continued)

*Primary Examiner* — Rena Dye
*Assistant Examiner* — Chaim Smith
(74) *Attorney, Agent, or Firm* — Fitch, Even, Tabin & Flannery LLP

(57) ABSTRACT

A cartridge for use in a beverage preparation machine, the cartridge containing one or more beverage ingredients and being formed from substantially air- and water-impermeable materials, the cartridge comprising an inlet for the introduction of an aqueous medium into the cartridge and an outlet for discharge of a beverage produced from the one or more beverage ingredients.

10 Claims, 14 Drawing Sheets

(56) References Cited

U.S. PATENT DOCUMENTS

| | | | |
|---|---|---|---|
| 1,311,844 A | 7/1919 | Wood | |
| 1,576,735 A | 3/1926 | Fessenden | |
| 1,887,905 A | 11/1932 | Schweigart | |
| 2,589,801 A | 3/1952 | Grindrod | |
| 2,778,739 A | 1/1957 | Rodth | |
| 3,083,101 A | 3/1963 | Noury | |
| 3,292,527 A | 12/1966 | Stasse | |
| 3,336,857 A | 8/1967 | Knodt et al. | |
| 3,403,617 A | 10/1968 | Lampe | |
| 3,607,297 A | 9/1971 | Fasano | |
| 3,790,029 A | 2/1974 | Ward | |
| 3,806,607 A | 4/1974 | Whelan | |
| 3,821,420 A | 6/1974 | Arden | |
| 3,823,656 A | 7/1974 | Vander Veken | |
| 3,833,740 A | 9/1974 | Schmidt | |
| D255,529 S | 6/1980 | Dziekonski | |
| 4,253,385 A | 3/1981 | Illy | |
| 4,334,640 A | 6/1982 | van Overbruggen et al. | |
| 4,382,402 A | 5/1983 | Alvarez | |
| 4,471,689 A | 9/1984 | Piana | |
| 4,484,515 A | 11/1984 | Illy | |
| 4,551,611 A | 11/1985 | Longo | |
| 4,562,081 A | 12/1985 | Buttermann, III | |
| 4,653,390 A | 3/1987 | Hayes | |
| 4,724,752 A | 2/1988 | Aliesch et al. | |
| 4,738,378 A | 4/1988 | Oakley et al. | |
| 4,744,291 A | 5/1988 | Wallin | |
| 4,775,048 A | 10/1988 | Baecchi et al. | |
| 4,787,299 A | 11/1988 | Levi et al. | |
| 4,806,375 A | 2/1989 | Favre | |
| 4,818,544 A | 4/1989 | Seward | |
| 4,838,152 A | 6/1989 | Kubicko et al. | |
| 4,846,052 A | 7/1989 | Favre et al. | |
| 4,853,234 A * | 8/1989 | Bentley et al. | 426/77 |
| 4,867,993 A | 9/1989 | Nordskog | |
| 4,873,915 A | 10/1989 | Newman et al. | |
| 4,875,408 A | 10/1989 | McGee | |
| 4,876,953 A | 10/1989 | Imamura et al. | |
| 4,886,674 A | 12/1989 | Seward et al. | |
| 4,917,005 A | 4/1990 | Knepler | |
| 4,920,870 A | 5/1990 | Newman et al. | |
| 4,921,712 A | 5/1990 | Malmquist | |
| 4,925,683 A | 5/1990 | Fischbach et al. | |
| 4,990,352 A | 2/1991 | Newman et al. | |
| 5,005,759 A | 4/1991 | Bouche | |
| 5,014,611 A | 5/1991 | Illy et al. | |
| 5,063,836 A | 11/1991 | Patel | |
| 5,072,660 A | 12/1991 | Helbling | |
| 5,082,676 A | 1/1992 | Love et al. | |
| 5,134,924 A | 8/1992 | Vicker | |
| 5,150,645 A | 9/1992 | Schiettecatte | |
| 5,178,058 A | 1/1993 | van Dort et al. | |
| 5,183,998 A | 2/1993 | Hoffman et al. | |
| 5,186,096 A | 2/1993 | Willi | |
| 5,197,374 A | 3/1993 | Fond | |
| 5,242,702 A | 9/1993 | Fond | |
| 5,259,295 A | 11/1993 | Timm | |
| 5,265,520 A | 11/1993 | Giuliano | |
| 5,272,960 A | 12/1993 | Kinna | |
| 5,285,717 A | 2/1994 | Knepler | |
| 5,287,797 A | 2/1994 | Grykiewicz et al. | |
| 5,303,639 A | 4/1994 | Bunn et al. | |
| 5,325,765 A | 7/1994 | Sylvan et al. | |
| 5,327,815 A | 7/1994 | Fond et al. | |
| 5,343,799 A | 9/1994 | Fond | |
| 5,347,916 A | 9/1994 | Fond et al. | |
| 5,349,897 A | 9/1994 | King et al. | |
| 5,375,508 A | 12/1994 | Knepler et al. | |
| 5,398,595 A | 3/1995 | Fond et al. | |
| 5,398,596 A | 3/1995 | Fond | |
| 5,408,917 A | 4/1995 | Lussi | |
| 5,440,972 A | 8/1995 | English | |
| 5,455,887 A | 10/1995 | Dam | |
| 5,463,932 A | 11/1995 | Olson | |
| 5,472,719 A | 12/1995 | Favre | |
| 5,479,849 A | 1/1996 | King et al. | |
| 5,531,152 A | 7/1996 | Gardosi | |
| 5,531,604 A | 7/1996 | Huang | |
| 5,549,035 A | 8/1996 | Wing-Chung | |
| 5,603,254 A | 2/1997 | Fond et al. | |
| 5,637,335 A | 6/1997 | Fond et al. | |
| 5,638,740 A | 6/1997 | Cai | |
| 5,638,741 A | 6/1997 | Cisaria | |
| 5,639,023 A | 6/1997 | Hild et al. | |
| 5,649,412 A | 7/1997 | Binacchi | |
| 5,649,472 A | 7/1997 | Fond et al. | |
| 5,704,275 A | 1/1998 | Warne | |
| 5,738,001 A | 4/1998 | Liverani | |
| 5,762,987 A | 6/1998 | Fond et al. | |
| 5,773,056 A | 6/1998 | Hohenthal et al. | |
| 5,776,527 A | 7/1998 | Blanc | |
| 5,794,519 A | 8/1998 | Fischer | |
| 5,826,492 A | 10/1998 | Fond et al. | |
| 5,840,189 A | 11/1998 | Sylvan | |
| 5,858,437 A | 1/1999 | Anson | |
| 5,862,738 A | 1/1999 | Warne | |
| 5,895,672 A | 4/1999 | Cooper | |
| 5,897,899 A | 4/1999 | Fond | |
| 5,921,168 A | 7/1999 | Nello | |
| 5,948,455 A | 9/1999 | Schaeffer et al. | |
| 5,967,021 A | 10/1999 | Yung | |
| 5,974,950 A | 11/1999 | King | |
| 5,992,298 A | 11/1999 | Illy et al. | |
| 5,997,936 A | 12/1999 | Jimenez-Laguna | |
| 6,000,317 A | 12/1999 | Van Der Meer | |
| 6,006,653 A | 12/1999 | Sham et al. | |
| 6,009,792 A | 1/2000 | Kraan | |
| D419,821 S | 2/2000 | Powell et al. | |
| 6,021,705 A | 2/2000 | Dijs | |
| 6,025,000 A | 2/2000 | Fond et al. | |
| D423,863 S | 5/2000 | Lupi | |
| 6,062,127 A | 5/2000 | Klosinski et al. | |
| 6,068,871 A | 5/2000 | Fond et al. | |
| 6,079,315 A | 6/2000 | Beaulieu et al. | |
| 6,082,245 A | 7/2000 | Nicolai | |
| 6,095,031 A | 8/2000 | Warne | |
| 6,109,168 A | 8/2000 | Illy et al. | |
| 6,117,471 A | 9/2000 | King | |
| 6,139,896 A | 10/2000 | Daenzer-Alloncle et al. | |
| 6,142,063 A | 11/2000 | Beaulieu et al. | |
| 6,170,386 B1 | 1/2001 | Paul | |
| 6,173,117 B1 | 1/2001 | Clubb | |
| 6,178,874 B1 | 1/2001 | Joergensen | |
| 6,182,554 B1 | 2/2001 | Beaulieu et al. | |
| 6,183,800 B1 | 2/2001 | van Straten et al. | |
| 6,186,051 B1 | 2/2001 | Aarts | |
| D443,792 S | 6/2001 | Peters et al. | |
| 6,240,832 B1 | 6/2001 | Schmed et al. | |
| 6,240,833 B1 | 6/2001 | Sham et al. | |
| 6,245,371 B1 | 6/2001 | Gutwein et al. | |
| 6,279,459 B1 | 8/2001 | Mork et al. | |
| 6,289,948 B1 | 9/2001 | Jeannin et al. | |
| D452,107 S | 12/2001 | Cahen | |
| 6,347,725 B1 | 2/2002 | Yoakim et al. | |
| 6,350,484 B1 | 2/2002 | Ault | |
| 6,358,545 B1 | 3/2002 | Chandler et al. | |
| 6,405,637 B1 | 6/2002 | Cai | |
| D459,628 S | 7/2002 | Cahen | |
| D460,653 S | 7/2002 | Cahen | |
| D461,358 S | 8/2002 | Cahen | |
| 6,468,576 B1 | 10/2002 | Sher et al. | |
| D475,567 S | 6/2003 | Hsu | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| D479,939 S | 9/2003 | Au | |
| 6,612,224 B2 | 9/2003 | Mercier et al. | |
| 6,644,173 B2 | 11/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney | |
| 6,698,228 B2 | 3/2004 | Kateman et al. | |
| 6,698,333 B2 | 3/2004 | Halliday et al. | |
| D489,930 S | 5/2004 | Tse | |

(56) References Cited

U.S. PATENT DOCUMENTS

| | | |
|---|---|---|
| 6,740,345 B2 | 5/2004 | Cai |
| 6,758,130 B2 | 7/2004 | Sargent et al. |
| 6,832,542 B2 | 12/2004 | Hu et al. |
| 6,849,285 B2 | 2/2005 | Masek et al. |
| 6,941,855 B2 | 9/2005 | Denisart et al. |
| 7,063,238 B2 | 6/2006 | Hale |
| 7,097,074 B2 | 8/2006 | Halliday et al. |
| 7,213,506 B2 | 5/2007 | Halliday et al. |
| 7,219,598 B2 | 5/2007 | Halliday et al. |
| 7,231,869 B2 | 6/2007 | Halliday et al. |
| 7,243,598 B2 * | 7/2007 | Halliday et al. ............ 99/295 |
| 7,255,039 B2 | 8/2007 | Halliday et al. |
| 7,287,461 B2 | 10/2007 | Halliday et al. |
| 7,308,851 B2 | 12/2007 | Halliday |
| 7,316,178 B2 | 1/2008 | Halliday et al. |
| 7,322,277 B2 | 1/2008 | Halliday et al. |
| 7,325,479 B2 | 2/2008 | Laigneau et al. |
| 7,328,651 B2 | 2/2008 | Halliday et al. |
| 7,335,387 B2 | 2/2008 | Hayes et al. |
| 7,340,990 B2 | 3/2008 | Halliday et al. |
| 7,418,899 B2 | 9/2008 | Halliday et al. |
| 7,444,925 B2 | 11/2008 | Mahlich |
| 7,533,603 B2 | 5/2009 | Halliday et al. |
| 7,533,604 B2 | 5/2009 | Halliday et al. |
| 7,592,027 B2 | 9/2009 | Halliday et al. |
| 7,607,385 B2 | 10/2009 | Halliday et al. |
| 7,640,843 B2 | 1/2010 | Halliday et al. |
| 8,168,247 B2 | 5/2012 | Halliday et al. |
| 2001/0019735 A1 | 9/2001 | Cirkel-Egner et al. |
| 2001/0048957 A1 | 12/2001 | Lazaris et al. |
| 2002/0002913 A1 | 1/2002 | Mariller et al. |
| 2002/0015768 A1 | 2/2002 | Masek et al. |
| 2002/0023543 A1 | 2/2002 | Schmed |
| 2002/0048621 A1 | 4/2002 | Boyd et al. |
| 2002/0078831 A1 | 6/2002 | Cai |
| 2002/0088807 A1 | 7/2002 | Perkovic et al. |
| 2002/0121197 A1 | 9/2002 | Mercier et al. |
| 2002/0121198 A1 | 9/2002 | Kollep et al. |
| 2002/0124736 A1 | 9/2002 | Kollep et al. |
| 2002/0129712 A1 | 9/2002 | Westbrook et al. |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2002/0148357 A1 | 10/2002 | Lazaris et al. |
| 2003/0005826 A1 | 1/2003 | Sargent et al. |
| 2003/0039731 A1 | 2/2003 | Dalton et al. |
| 2003/0056655 A1 | 3/2003 | Kollep et al. |
| 2003/0066431 A1 | 4/2003 | Fanzutti et al. |
| 2003/0145736 A1 | 8/2003 | Green |
| 2003/0222089 A1 | 12/2003 | Hale |
| 2004/0045443 A1 | 3/2004 | Lazaris et al. |
| 2004/0182250 A1 | 9/2004 | Halliday et al. |
| 2004/0228955 A1 | 11/2004 | Denisart et al. |
| 2004/0237793 A1 | 12/2004 | Zurcher et al. |
| 2005/0051478 A1 | 3/2005 | Karanikos |
| 2005/0287251 A1 | 12/2005 | Lazaris et al. |
| 2007/0175334 A1 | 8/2007 | Halliday et al. |
| 2008/0014315 A1 | 1/2008 | DeLease |
| 2010/0078446 A1 | 4/2010 | Halliday et al. |
| 2012/0058226 A1 | 3/2012 | Winkler et al. |

FOREIGN PATENT DOCUMENTS

| | | |
|---|---|---|
| EP | 0162417 | 11/1985 |
| EP | 0272922 | 6/1988 |
| EP | 0324072 | 7/1989 |
| EP | 0334571 | 9/1989 |
| EP | 0334572 | 9/1989 |
| EP | 0449533 | 10/1991 |
| EP | 0451980 | 10/1991 |
| EP | 0455337 | 11/1991 |
| EP | 0469162 | 2/1992 |
| EP | 0521510 | 1/1993 |
| EP | 0524464 | 1/1993 |
| EP | 0638486 | 2/1995 |
| EP | 0604615 | 9/1998 |
| EP | 0862882 | 9/1998 |
| EP | 0870457 | 10/1998 |
| EP | 0904718 | 3/1999 |
| EP | 0756844 | 5/1999 |
| EP | 0919171 | 6/1999 |
| EP | 1042978 | 10/2000 |
| EP | 1048220 | 11/2000 |
| EP | 1090574 | 4/2001 |
| EP | 1095605 | 5/2001 |
| EP | 1101430 | 5/2001 |
| EP | 1153561 | 11/2001 |
| EP | 0878158 | 3/2002 |
| EP | 1208782 | 5/2002 |
| EP | 1255685 | 11/2002 |
| EP | 1274332 | 1/2003 |
| EP | 1316283 | 6/2003 |
| EP | 144910 | 7/2004 |
| EP | 1440903 | 7/2004 |
| EP | 1440907 | 7/2004 |
| EP | 1440908 | 7/2004 |
| EP | 1541070 | 11/2006 |
| EP | 1795074 | 6/2007 |
| FR | 1537031 | 8/1968 |
| FR | 2322796 | 4/1977 |
| GB | 468248 | 7/1936 |
| GB | 828529 | 2/1960 |
| GB | 1215840 | 12/1970 |
| GB | 2306432 | 5/1997 |
| GB | 2374795 | 10/2002 |
| GB | 2374816 | 10/2002 |
| GB | 2374856 | 10/2002 |
| GB | 2397497 | 1/2003 |
| GB | 2379624 | 3/2003 |
| JP | 63092317 | 4/1988 |
| JP | 04236921 | 8/1992 |
| JP | 06000059 | 1/1994 |
| JP | 11196769 | 7/1999 |
| JP | 200093309 | 4/2000 |
| JP | 2000355375 | 12/2000 |
| JP | 2001061663 | 3/2001 |
| KR | 1020020012291 | 4/2002 |
| NL | 1020835 | 12/2003 |
| WO | 8807472 | 10/1988 |
| WO | 9507648 | 3/1995 |
| WO | 9516377 | 6/1995 |
| WO | 9717006 | 5/1997 |
| WO | 9733813 | 9/1997 |
| WO | 9827854 | 7/1998 |
| WO | 0028868 | 5/2000 |
| WO | 0042891 | 7/2000 |
| WO | 0115582 | 3/2001 |
| WO | 0130218 | 5/2001 |
| WO | 0158786 | 8/2001 |
| WO | 0160219 | 8/2001 |
| WO | 0160220 | 8/2001 |
| WO | 0182760 | 11/2001 |
| WO | 0200031 | 1/2002 |
| WO | 0219875 | 3/2002 |
| WO | 0228241 | 4/2002 |
| WO | 0244956 | 6/2002 |
| WO | 02074143 | 9/2002 |
| WO | 02074661 | 9/2002 |
| WO | 02082962 | 10/2002 |
| WO | 02085170 | 10/2002 |
| WO | 02087400 | 11/2002 |
| WO | 02092439 | 11/2002 |
| WO | 03028470 | 4/2003 |
| WO | 03039309 | 5/2003 |
| WO | 03053200 | 7/2003 |
| WO | 03059778 | 7/2003 |

(56) References Cited

FOREIGN PATENT DOCUMENTS

| WO | 03065859 | 8/2003 |
|----|----------|--------|
| WO | 03073896 | 9/2003 |
| WO | 2004006740 | 1/2004 |
| WO | 2006043106 | 4/2006 |
| WO | 2008057224 | 5/2008 |

OTHER PUBLICATIONS

Viscosity Information, OEC Fluid Handling Inc., [on iine] retrieved on Jan. 27, 2013 Retrieved from the Internet: URL: <http://www.oecfh.com/downloads/viscosity-information.pdf>.

"More Solutions to Sticky Problems," A Guide to Getting More From Your Brookfield Viscometer, Brookfield Engineering Laboratories, Inc., Stoughton, MA, May 1985, 28 pages.

Scherz, Heimo et al., "Food composition and Nutrition Tables," Stuttgart : Medpharm Scientific Publishers, 1994, Ed. 5, 5 pages.

Walstra, Peter, "Dairy Chemistry and Physics," 1984, 3 pages.

"The Helipath Stand," A Brookfield Viscometer Accessory, Brookfield Engineering Laboratories, Inc. Stoughton MA, date unknown, 2 pages.

Japanese Patent Office, Official Notice of Rejection mailed on Sep. 10, 2013, from corresponding Japanese Patent App. No. 2012-145777, 4 pages.

\* cited by examiner

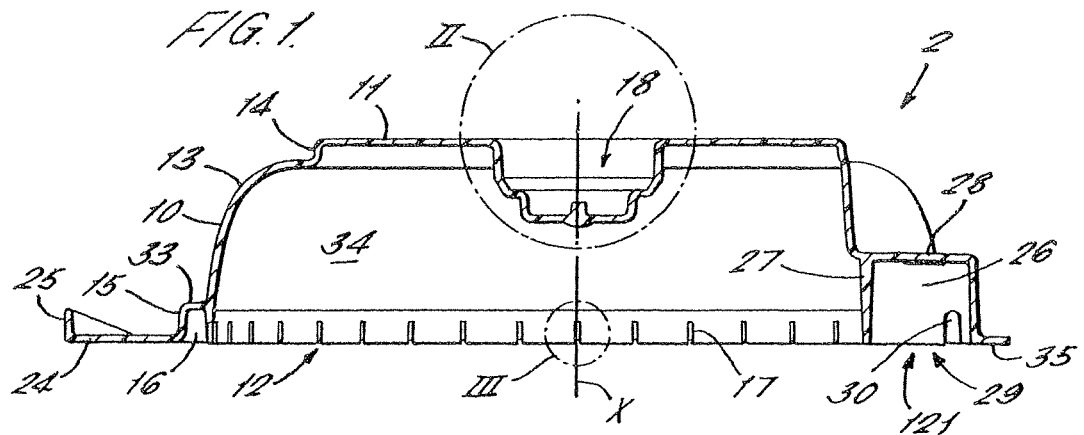
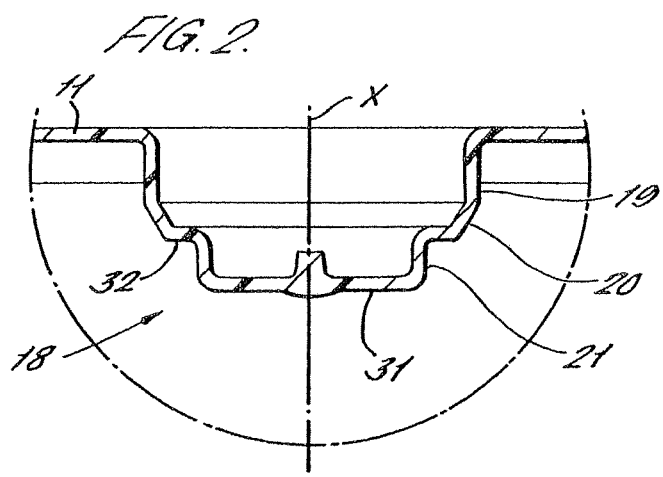
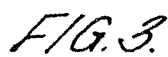
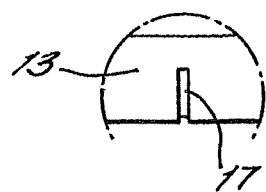

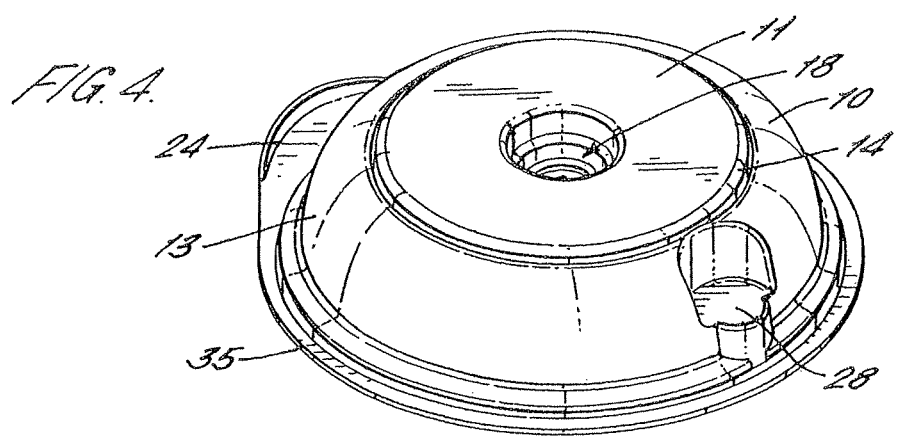
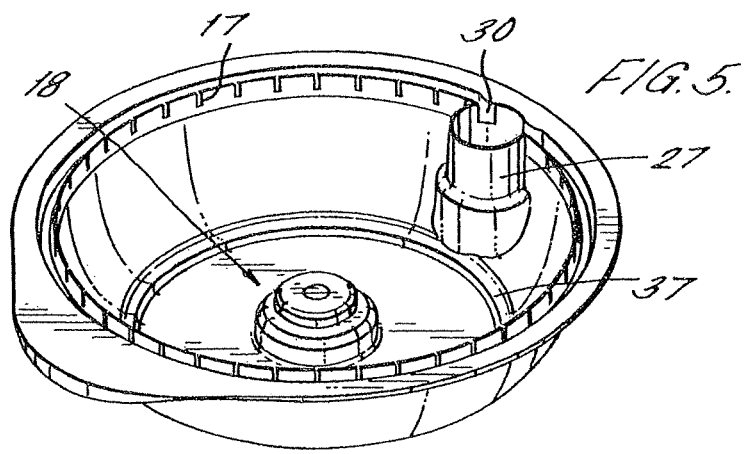
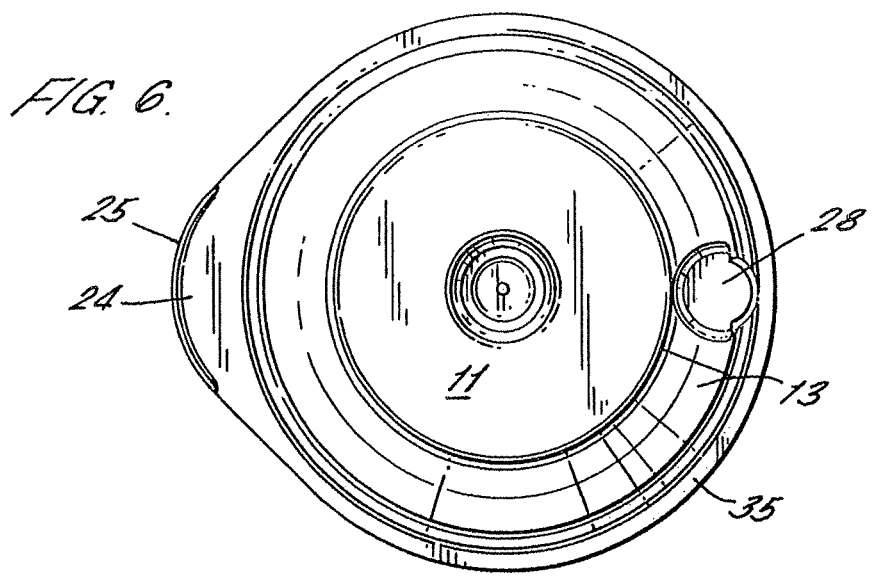

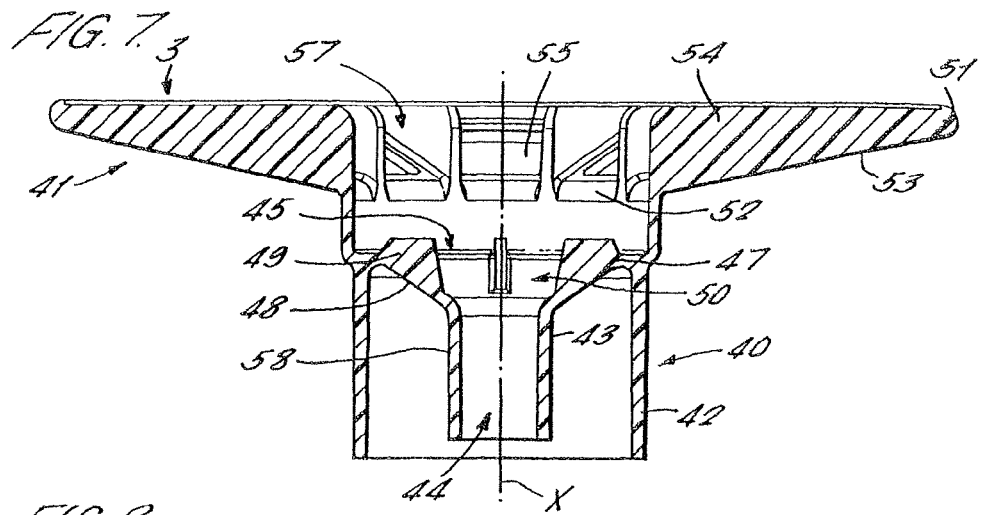
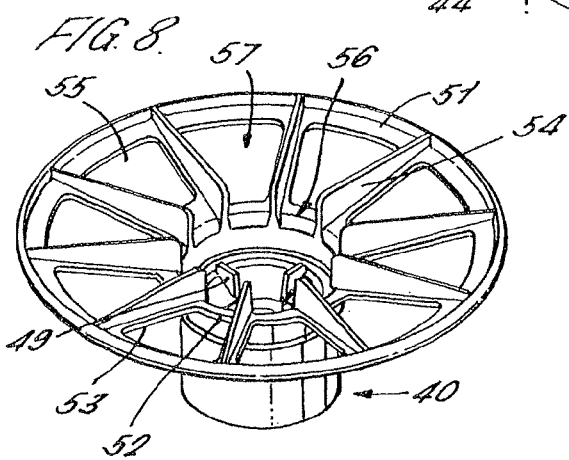
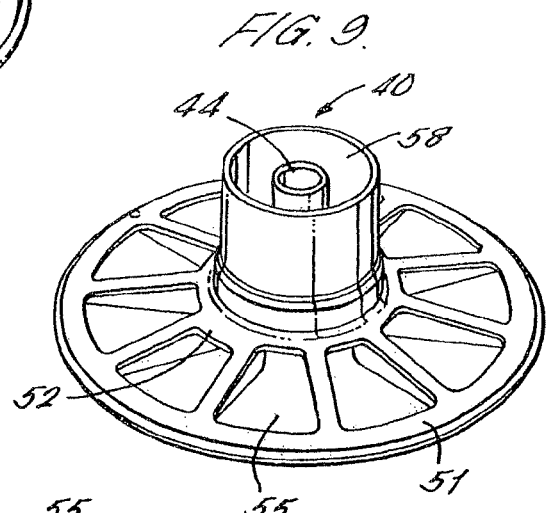
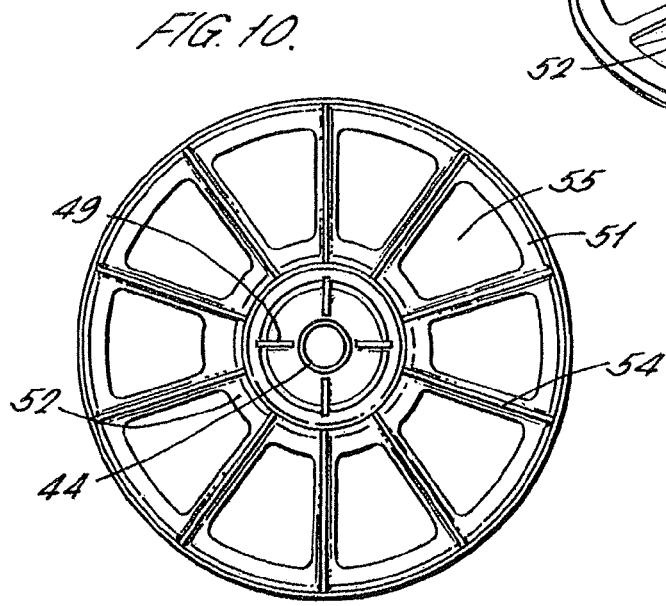

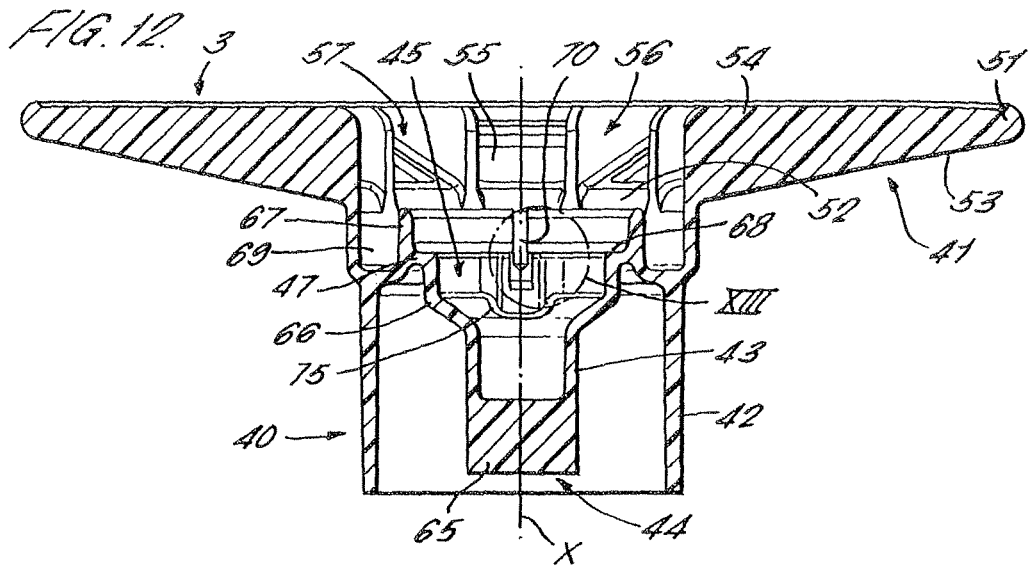
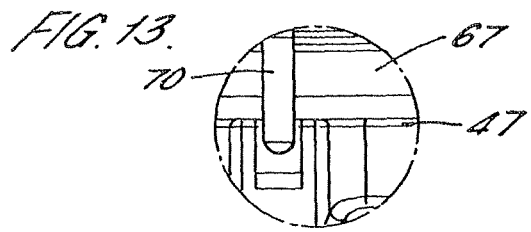
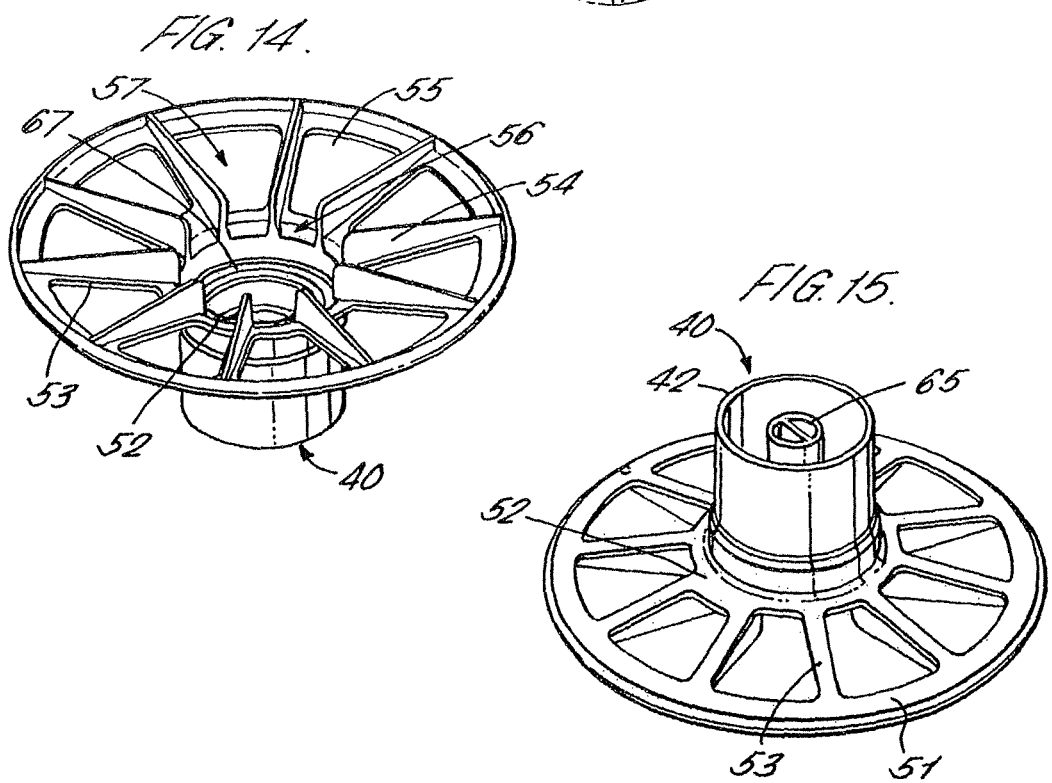

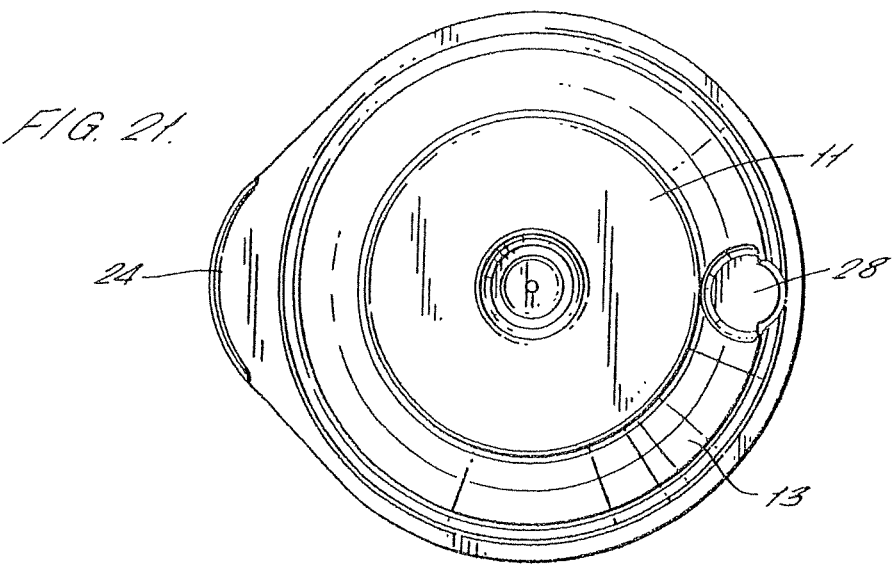
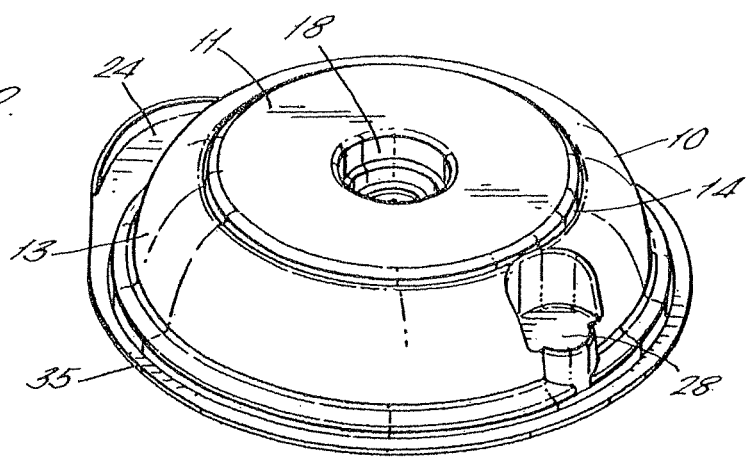
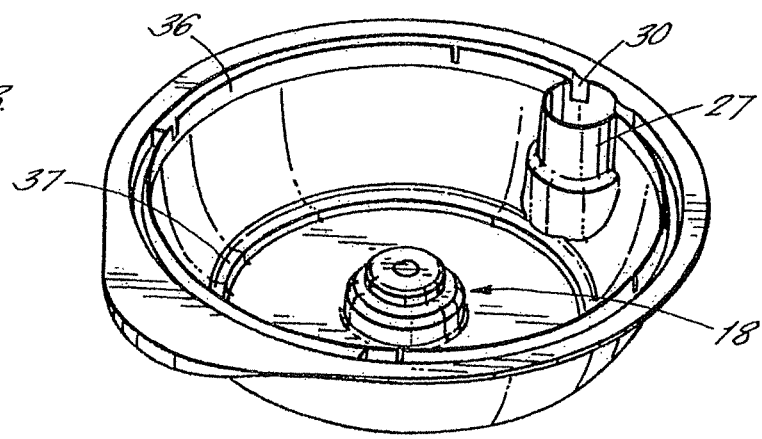

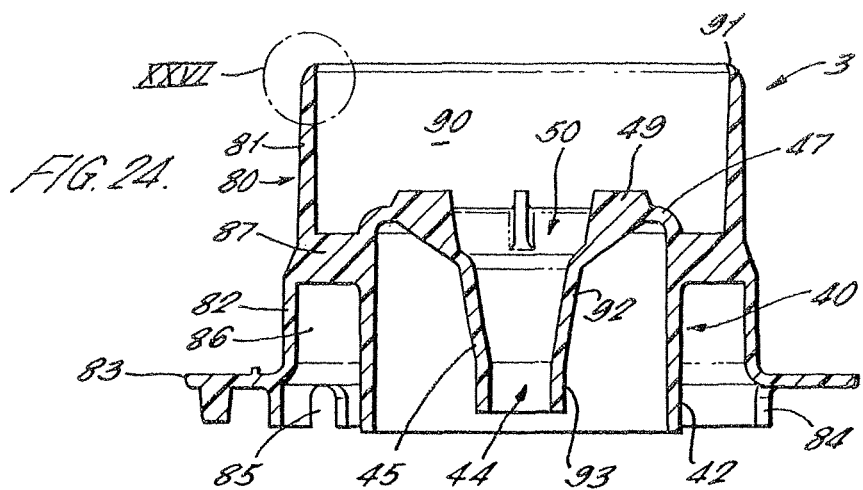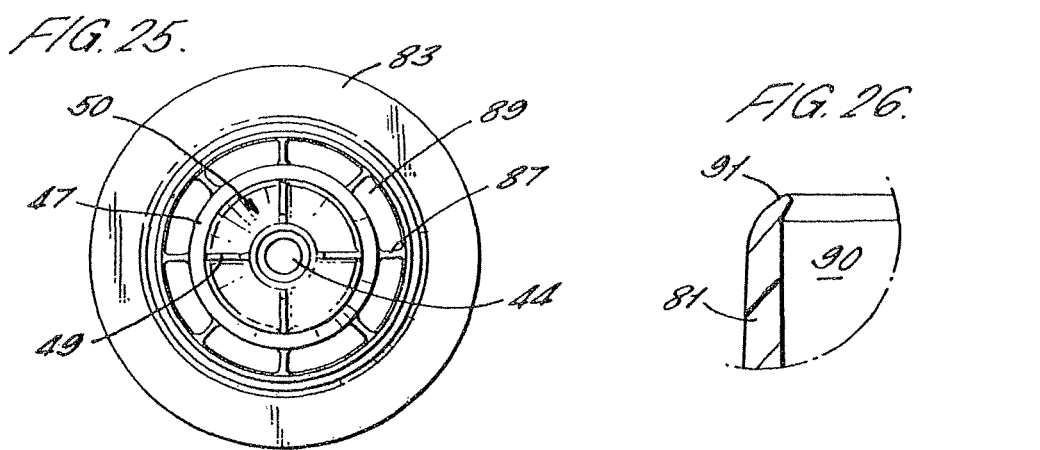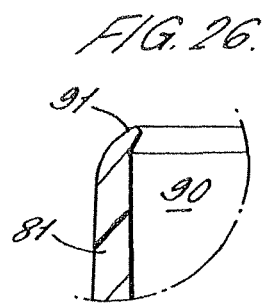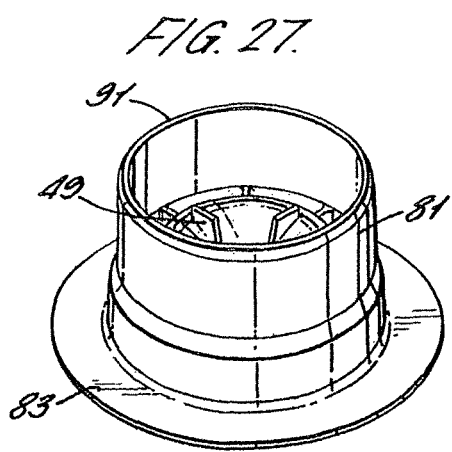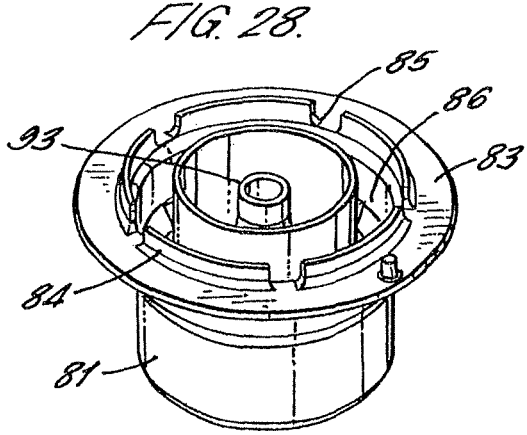

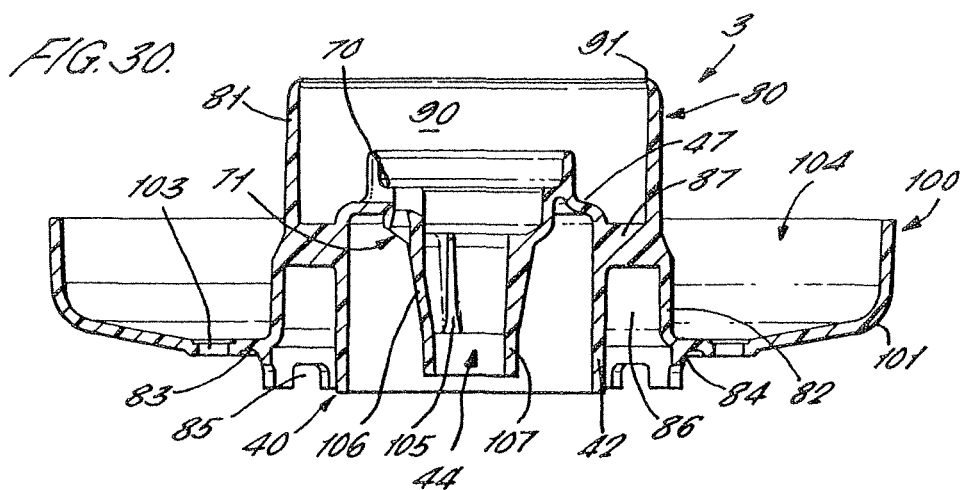
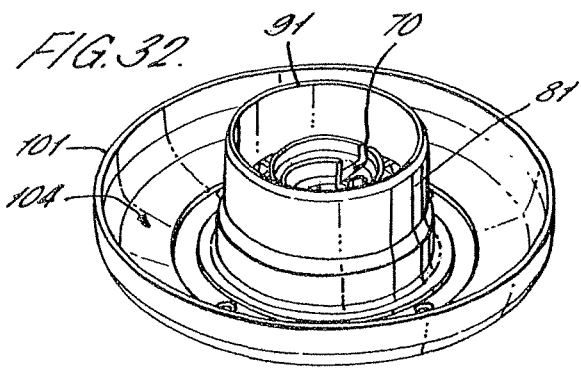
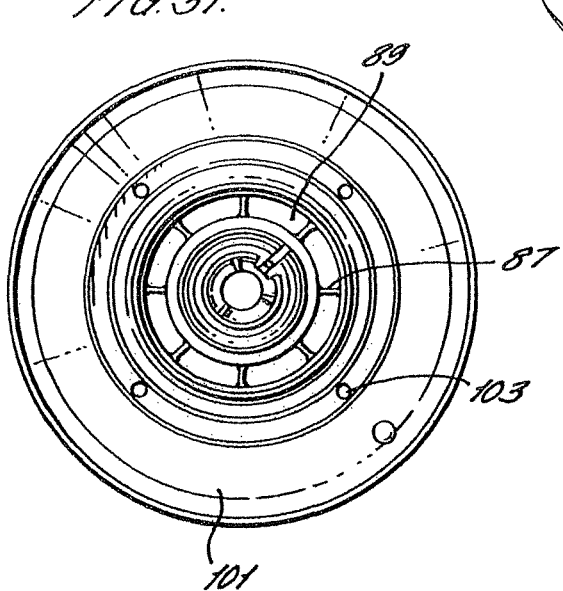
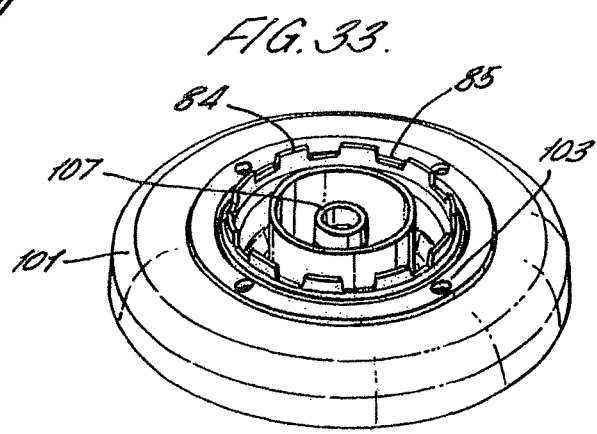

CARTRIDGE FOR THE PREPARATION OF BEVERAGES

CROSS-REFERENCE TO RELATED APPLICATIONS

This application is a continuation of U.S. patent application Ser. No. 13/399,423, filed Feb. 7, 2012, which is a continuation of U.S. patent application Ser. No. 12/631,058, filed Dec. 4, 2009, which issued as U.S. Pat. No. 8,168,247 on May 1, 2012, which is a divisional of U.S. patent application Ser. No. 10/763,680, filed Jan. 23, 2004, which issued as U.S. Pat. No. 7,640,843 on Jan. 5, 2010, which claims the benefit of U.S. Provisional Patent Application No. 60/462,538, filed Apr. 11, 2003, and United Kingdom Patent Application No. GB 0301702.7, filed Jan. 24, 2003, which are all hereby incorporated herein by reference in their entireties.

BACKGROUND

The present invention relates to a cartridge and method for the preparation of beverages and, in particular, using sealed cartridges which are formed from substantially air- and water-impermeable materials and which contain one or more ingredients for the preparation of beverages.

It has previously been proposed to seal beverage preparation ingredients in individual air-impermeable packages. For example, cartridges or capsules containing compacted ground coffee are known for use in certain coffee preparation machines which are generally termed "espresso" machines. In the production of coffee using these preparation machines the coffee cartridge is placed in a brewing chamber and hot water is passed though the cartridge at relatively high pressures, thereby extracting the aromatic coffee constituents from the ground coffee to produce the coffee beverage. Typically, such machines operate at a pressure of greater than $6 \times 10^5$ Pa. The preparation machines of the type described have to date been relatively expensive since components of the machine, such as the water pumps and seals, must be able to withstand the high pressures.

In WO 01/58786 there is described a cartridge for the preparation of beverages which operates at a pressure generally in the range 0.7 to $2.0 \times 10^5$ Pa. However, the cartridge is designed for use in a beverage preparation machine for the commercial or industrial market and is relatively expensive. Hence, there remains a requirement for a cartridge for the preparation of beverages wherein the cartridges and beverage preparation machine are suitable, in particular, for the domestic market in terms of cost, performance and reliability.

It is known to provide dairy-based beverage ingredients in cartridges in the form of a powder or other dehydrated form. However, consumers consistently indicate that the use of such powdered dairy-based products adversely affects the taste, colour and texture of the final beverage. In addition, powdered dairy products cannot be used to produce an authentic looking frothy milk-based foam as desired by consumers for cappuccino-style beverages. A number of beverage preparation machines provide a steam wand or similar for frothing of a quantity of milk. However, the addition of the steam wand increases the cost of the machine and requires a means for generating steam. Operation of the steam wand must be done manually and requires experience to be successful. In addition, since steam is being used there is the potential for the consumer to be burnt by either the steam or hot components of the machine. Further, the consumer must keep a supply of milk available separate from the machine.

SUMMARY

The cartridge of the present invention contains one or more beverage ingredients suitable for the formation of a beverage product. The liquid beverage product may be, for example, one of coffee, tea, chocolate or a dairy-based beverage including milk.

It will be understood that by the term "cartridge" as used herein is meant any package, container, sachet or receptacle which contains one or more beverage ingredients in the manner described. The cartridge may be rigid, semi-rigid or flexible.

Advantageously, the liquid beverage ingredient provides a superior beverage in look, taste and mouth feel compared to a beverage prepared from a powdered product. The liquid beverage may also be foamed by the beverage preparation machine to produce a cappuccino-style froth. The cartridge containing the liquid beverage ingredient may be used in the same beverage preparation machine as cartridges containing solid or soluble beverage ingredients. No separate wand or steam supply is required to effect the foaming.

Accordingly, in one aspect the present invention provides a cartridge for use in a beverage preparation machine, the cartridge containing one or more beverage ingredients and being formed from substantially air- and water-impermeable materials, wherein the one or more beverage ingredients is a liquid chocolate ingredient.

The cartridge may comprise an inlet for the introduction of an aqueous medium into the cartridge and an outlet for discharge of a beverage produced from the liquid chocolate ingredient.

Preferably, the liquid chocolate ingredient is concentrated. The use of concentrated liquids allows for larger volumes of beverage to be dispensed. The liquid chocolate ingredient may contain greater than 40% total solids. The liquid chocolate ingredient may contain between 70 and 95% total solids. The liquid chocolate ingredient may contain about 90% total solids.

The liquid chocolate ingredient may be in the form of a gel. The liquid chocolate ingredient may have a viscosity of between 70 and 3900 mPa at ambient temperature. The viscosity may be between 1700 and 3900 mPa at ambient temperature.

Typically, the liquid chocolate ingredient contains cocoa solids. The liquid chocolate ingredient may contain between 50 and 80% total cocoa solids. The liquid chocolate ingredient may contain between 60 and 70% total cocoa solids.

This aspect of the present invention also provides a method of dispensing a beverage from a cartridge containing one or more liquid chocolate ingredients during an operating cycle, comprising the steps of passing an aqueous medium through the cartridge to form a beverage by dilution of said one or more chocolate ingredients, and dispensing the beverage into a receptacle, wherein the one or more liquid chocolate ingredients is diluted by a ratio of between 2 to 1 and 10 to 1.

The method may further comprise the step of passing the beverage through means to produce foaming of the beverage, wherein the level of foaming is greater than 70%. The level of foaming is measured as the ratio of the volume of foam produced to the volume of the original liquid beverage ingredient. Foaming is particularly advantageous for dispensing beverages such as cappuccinos and milk shakes.

Another aspect of the present invention provides a cartridge for use in a beverage preparation machine, the cartridge containing one or more beverage ingredients and being formed from substantially air- and water-impermeable materials, wherein the one or more beverage ingredients is a liquid milk ingredient.

The cartridge may comprise an inlet for the introduction of an aqueous medium into the cartridge and an outlet for discharge of a beverage produced from the liquid milk ingredient.

The liquid milk ingredient may be concentrated. The use of concentrated liquids allows for larger volumes of beverage to be dispensed. The liquid milk ingredient may contain between 25 and 40% total solids. The liquid milk ingredient may contain 30% total solids.

The liquid milk ingredient may have a viscosity of between 70 and 3900 mPa at ambient temperature.

The liquid milk ingredient may contain between 0.1 and 12% fat.

This aspect of the present invention also provides a method of dispensing a beverage from a cartridge containing one or more liquid milk ingredients during an operating cycle, comprising the steps of passing an aqueous medium through the cartridge to form a beverage by dilution of said one or more liquid ingredients, and dispensing the beverage into a receptacle, wherein the one or more liquid milk ingredients is diluted by a ratio of between 1 to 1 and 6 to 1.

The one or more liquid milk ingredients may be diluted by a ratio of around 3 to 1.

The method may further comprise the step of passing the beverage through means to produce foaming of the beverage, wherein the level of foaming is greater than 40%.

Another aspect of the present invention provides a cartridge for use in a beverage preparation machine, the cartridge containing one or more beverage ingredients and being formed from substantially air- and water-impermeable materials, wherein the one or more beverage ingredients is a liquid coffee ingredient.

The cartridge may comprise an inlet for the introduction of an aqueous medium into the cartridge and an outlet for discharge of a beverage produced from the liquid coffee ingredient.

The liquid coffee ingredient may be concentrated. The use of concentrated liquids allows for larger volumes of beverage to be dispensed. The liquid coffee may contain between 40 and 70% total solids. The liquid coffee may contain between 55 and 67% total solids.

The liquid coffee ingredient may contain sodium bicarbonate. The coffee ingredient may contain between 0.1 and 2.0% by weight sodium bicarbonate. The cartridge may contain between 0.5 and 1.0% by weight sodium bicarbonate.

The liquid coffee ingredient may have a viscosity of between 70 and 3900 mPa at ambient temperature. The viscosity may be between 70 and 2000 mPa at ambient temperature.

This aspect of the present invention also provides a method of dispensing a beverage from a cartridge containing one or more liquid coffee ingredients during an operating cycle, comprising the steps of passing an aqueous medium through the cartridge to form a beverage by dilution of said one or more liquid coffee ingredients, and dispensing the beverage into a receptacle, wherein the one or more liquid coffee ingredients is diluted by a ratio of between 10 to 1 and 100 to 1.

The one or more liquid coffee ingredients may be diluted by a ratio of between 20 to 1 and 70 to 1.

The method may further comprise the step of passing the beverage through means to produce foaming of the beverage, wherein the level of foaming is greater than 70%.

Another aspect of the present invention provides a cartridge for use in a beverage preparation machine, the cartridge containing one or more beverage ingredients and being formed from substantially air- and water-impermeable materials, wherein the one or more beverage ingredients is any of a soup, fruit juice, flavoured milk, carbonated beverage, sauce or dessert.

The cartridge may comprises an inlet for the introduction of an aqueous medium into the cartridge and an outlet for discharge of a beverage produced from the one or more beverage ingredients.

For all aspects of the present invention, the cartridge may comprise an outer member and an inner member conjoined on assembly with the outer member. A snap-fit arrangement may be provided to conjoin the outer member and the inner member on assembly of the cartridge.

The cartridge may further comprise means for producing a jet of the beverage, wherein said means for producing the jet of the beverage comprises an aperture in the beverage flow path.

The cartridge may further comprise at least one inlet for air and means for generating a pressure reduction of the jet of beverage, whereby, in use, air from the at least one air inlet is incorporated into the beverage as a plurality of small bubbles.

The present invention also describes a beverage as produced by any of the above mentioned methods.

In the following description the terms "upper" and "lower" and equivalents will be used to describe the relational positioning of features of the invention. The terms "upper" and "lower" and equivalents should be understood to refer to the cartridge (or other components) in its normal orientation for insertion into a beverage preparation machine and subsequent dispensing as shown, for example, in FIG. 4. In particular, "upper" and "lower" refer, respectively, to relative positions nearer or further from a top surface 11 of the cartridge. In addition, the terms "inner" and "outer" and equivalents will be used to describe the relational positioning of features of the invention. The terms "inner" and "outer" and equivalents should be understood to refer to relative positions in the cartridge (or other components) being, respectively, nearer or further from a centre or major axis X of the cartridge 1 (or other component).

Embodiments of the present invention will now be described, by way of example only, with reference to the accompanying drawings, in which:

BRIEF DESCRIPTION OF THE DRAWINGS

FIG. 1 is cross-sectional drawing of an outer member of first and second embodiments of cartridge;

FIG. 2 is a cross-sectional drawing of a detail of the outer member of FIG. 1 showing an inwardly directed cylindrical extension;

FIG. 3 is a cross-sectional drawing of a detail of the outer member of FIG. 1 showing a slot;

FIG. 4 is a perspective view from above of the outer member of FIG. 1;

FIG. 5 is a perspective view from above of the outer member of FIG. 1 in an inverted orientation;

FIG. 6 is a plan view from above of the outer member of FIG. 1;

FIG. 7 is a cross-sectional drawing of an inner member of the first embodiment of cartridge;

FIG. 8 is a perspective view from above of the inner member of FIG. 7;

FIG. 9 is a perspective view from above of the inner member of FIG. 7 in an inverted orientation;

FIG. 10 is a plan view from above of the inner member of FIG. 7;

FIG. 12 is a cross-sectional drawing of an inner member of the second embodiment of cartridge;

FIG. 13 is a cross-sectional drawing of a detail of the inner member of FIG. 12 showing an aperture;

FIG. 14 is a perspective view from above of the inner member of FIG. 12;

FIG. 15 is a perspective view from above of the inner member of FIG. 12 in an inverted orientation;

FIG. 21 is a plan view from above of the outer member of FIG. 19;

FIG. 22 is a perspective view from above of the outer member of FIG. 19;

FIG. 23 is a perspective view from above of the outer member of FIG. 19 in an inverted orientation;

FIG. 24 is a cross-sectional drawing of an inner member of the third embodiment of cartridge;

FIG. 25 is a plan view from above of the inner member of FIG. 24;

FIG. 26 is a cross-sectional drawing of a detail of the inner member of FIG. 24 showing an in-turned upper rim;

FIG. 27 is a perspective view from above of the inner member of FIG. 24;

FIG. 28 is a perspective view from above of the inner member of FIG. 24 in an inverted orientation;

FIG. 30 is a cross-sectional drawing of an inner member of the fourth embodiment of cartridge;

FIG. 31 is a plan view from above of the inner member of FIG. 30;

FIG. 32 is a perspective view from above of the inner member of FIG. 30;

FIG. 33 is a perspective view from above of the inner member of FIG. 30 in an inverted orientation;

DETAILED DESCRIPTION

Figure 11:
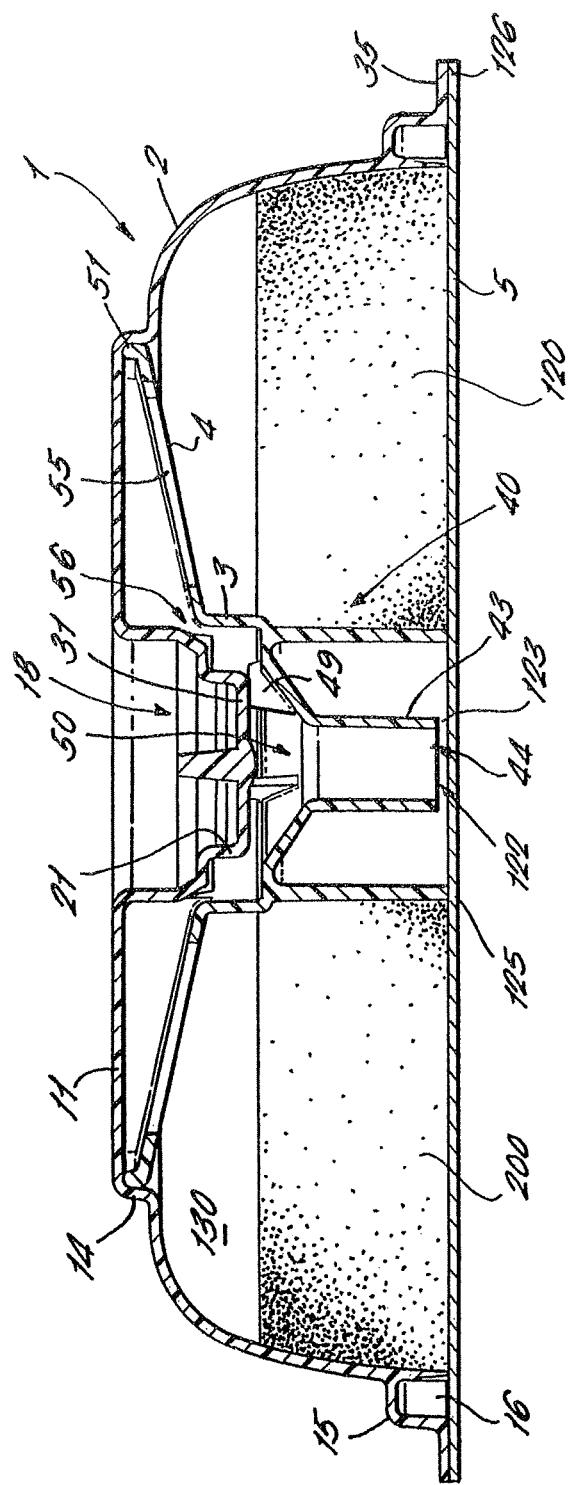
FIG. 11 is a cross-sectional drawing of the first embodiment of cartridge in an assembled condition.

As shown in FIG. 11, the cartridge 1 generally comprises an outer member 2, an inner member 3 and a laminate 5. The outer member 2, inner member 3 and laminate 5 are assembled to form the cartridge 1 which has an interior 120 for containing one or more beverage ingredients, an inlet 121, an outlet 122 and a beverage flow path linking the inlet 121 to the outlet 122 and which passes through the interior 120. The inlet 121 and outlet 122 are initially sealed by the laminate 5 and are opened in use by piercing or cutting of the laminate 5. The beverage flow path is defined by spatial inter-relationships between the outer member 2, inner member 3 and laminate 5 as discussed below. Other components may optionally be included in the cartridge 1, such as a filter 4, as will be described further below.

A first version of cartridge 1 which will be described for background purposes is shown in FIGS. 1 to 11. The first version of the cartridge 1 is particularly designed for use in dispensing filtered products such as roast and ground coffee or leaf tea. However, this version of the cartridge 1 and the other versions described below may be used with other products such as chocolate, coffee, tea, sweeteners, cordials, flavourings, alcoholic beverages, flavoured milk, fruit juices, squashes, sauces and desserts.

As can be seen from FIG. 5, the overall shape of the cartridge 1 is generally circular or disc-shaped with the diameter of the cartridge 1 being significantly greater than its height. A major axis X passes through the centre of the outer member as shown in FIG. 1. Typically the overall diameter of the outer member 2 is 74.5 mm±6 mm and the overall height is 16 mm±3 mm. Typically the volume of the cartridge 1 when assembled is 30.2 ml±20%.

The outer member 2 generally comprises a bowl-shaped shell 10 having a curved annular wall 13, a closed top 11 and an open bottom 12. The diameter of the outer member 2 is smaller at the top 11 compared to the diameter at the bottom 12, resulting from a flaring of the annular wall 13 as one traverses from the closed top 11 to the open bottom 12. The annular wall 13 and closed bottom 11 together define a receptacle having an interior 34.

A hollow inwardly directed cylindrical extension 18 is provided in the closed top 11 centred on the major axis X. As more clearly shown in FIG. 2, the cylindrical extension 18 comprises a stepped profile having first, second and third portions 19, 20 and 21. The first portion 19 is right circular cylindrical. The second portion 20 is frusto-conical in shape and is inwardly tapered. The third portion 21 is another right circular cylinder and is closed off by a lower face 31. The diameter of the first, second and third portion 19, 20 and 21 incrementally decreases such that the diameter of the cylindrical extension 18 decreases as one traverses from the top 11 to the closed lower face 31 of the cylindrical extension 18. A generally horizontal shoulder 32 is formed on the cylindrical extension 18 at the junction between the second and third portions 20 and 21.

An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to provide gas and liquid communication between the manifold 16 and the interior 34 of the outer member 2. As shown in FIG. 3, the slots 17 comprise vertical slits in the annular wall 13. Between 20 and 40 slots are provided. In the embodiment shown thirty-seven slots 17 are provided generally equi-spaced around the circumference of the manifold 16. The slots 17 are preferably between 1.4 and 1.8 mm in length. Typically the length of each slot is 1.6 mm representing 10% of the overall height of the outer member 2. The width of each slot is between 0.25 and 0.35 mm. Typically, the width of each slot is 0.3 mm. The width of the slots 17 is sufficiently narrow to prevent the beverage ingredients passing therethrough into the manifold 16 either during storage or in use.

An inlet chamber 26 is formed in the outer member 2 at the periphery of the outer member 2. A cylindrical wall 27 is provided, as most clearly shown in FIG. 5, which defines the inlet chamber 26 within, and partitions the inlet chamber 26 from, the interior 34 of the outer member 2. The cylindrical wall 27 has a closed upper face 28 which is formed on a plane perpendicular to the major axis X and an open lower end 29 co-planar with the bottom 12 of the outer member 2. The inlet chamber 26 communicates with the manifold 16 via two slots 30 as shown in FIG. 1. Alternatively, between one and four slots may be used to communicate between the manifold 16 and the inlet chamber 26.

A lower end of the outwardly extending shoulder 33 is provided with an outwardly extending flange 35 which extends perpendicularly to the major axis X. Typically the flange 35 has a width of between 2 and 4 mm. A portion of the flange 35 is enlarged to form a handle 24 by which the outer member 2 may be held. The handle 24 is provided with an upturned rim 25 to improve grip.

The outer member 2 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may be opaque, transparent or translucent. The manufacturing process may be injection moulding.

The inner member 3 as shown in FIGS. 7 to 10 comprises an annular frame 41 and a downwardly extending cylindrical funnel 40. A major axis X passes through the centre of the inner member 3 as shown in FIG. 7.

As best shown in FIG. 8, the annular frame 41 comprises an outer rim 51 and an inner hub 52 joined by ten equi-spaced radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 4 may also be treated or coated with a material which is activated by heat and/or pressure so that it can be sealed to the annular frame 41 in this way.

As shown in the cross-sectional profile of FIG. 7, the inner hub 52 is located at a lower position than the outer rim 51, resulting in the annular frame 41 having a sloping lower profile.

The upper surface of each spoke 53 is provided with an upstanding web 54 which divides a void space above the annular frame 41 into a plurality of passages 57. Each passage 57 is bounded on either side by a web 54 and on a lower face by the filter 4. The passages 57 extend from the outer rim 51 downwardly towards, and open into, the cylindrical funnel 40 at openings 56 defined by the inner extremities of the webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with the openings 56 of the passages 57 and an outlet 44 at a lower end through which the prepared beverage is discharged into a cup or other receptacle. The discharge spout 43 comprises a frusto-conical portion 48 at an upper end and a cylindrical portion 58 at a lower end. The cylindrical portion 58 may have a slight taper such that it narrows towards the outlet 44. The frusto-conical portion 48 helps to channel beverage from the passages 57 down towards the outlet 44 without inducing turbulence to the beverage. An upper surface of the frusto-conical portion 48 is provided with four support webs 49 equi-spaced around the circumference of the cylindrical funnel 40. The support webs 49 define channels 50 therebetween. The upper edges of the support webs 49 are level with one another and perpendicular to the major axis X.

The inner member 3 may be formed as a single integral piece from polypropylene or a similar material as described above and by injection moulding in the same manner as the outer member 2.

Alternatively, the inner member 3 and/or the outer member 2 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minn., USA), starch-based polymers, cellulose derivatives and polypeptides.

The laminate 5 is formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate is particularly advantageous as it has a high resistance to curling during assembly. As a result the laminate 5 may be pre-cut to the correct size and shape and subsequently transferred to the assembly station on the production line without undergoing distortion. Consequently, the laminate 5 is particularly well suited to welding. Other laminate materials may be used including PET/Aluminium/PP, PE/EVOH/PP, PET/metallised/PP and Aluminium/PP laminates. Roll laminate stock may be used instead of die cut stock.

The cartridge 1 may be closed by a rigid or semi-rigid lid instead of a flexible laminate.

Assembly of the cartridge 1 involves the following steps:
 a) the inner member 3 is inserted into the outer member 2;
 b) the filter 4 is cut to shape and placed onto the inner member 3 so to be received over the cylindrical funnel 40 and come to rest against the annular frame 41;
 c) the inner member 3, outer member 2 and filter 4 are joined by ultrasonic welding;
 d) the cartridge 1 is filled with one or more beverage ingredients;
 e) the laminate 5 is affixed to the outer member 2.

These steps will be discussed in greater detail below.

The outer member 2 is orientated with the open bottom 12 directed upwards. The inner member 3 is then inserted into the outer member 2 with the outer rim 51 being received as a loose fit in an axial extension 14 at top 11 of the cartridge 1. The cylindrical extension 18 of the outer member 2 is at the same time received in the upper portion of the cylindrical funnel 40 of the inner member 3. The third portion 21 of the cylindrical extension 18 is seated inside the cylindrical funnel 40 with the closed lower face 31 of the cylindrical extension 18 bearing against the support webs 49 of the inner member 3. The filter 4 is then placed over the inner member 3 such that the filter material contacts the annular rim 51. An ultrasonic welding process is then used to join the filter 4 to the inner member 3 and at the same time, and in the same process step, the inner member 3 to the outer member 2. The inner member 3 and filter 4 are welded around the outer rim 51. The inner member 3 and outer member 2 are joined by means of weld lines around the outer rim 51 and also the upper edges of the webs 54.

As shown most clearly in FIG. 11, the outer member 2 and inner member 3 when joined together define a void space 130 in the interior 120 below the annular flange 41 and exterior the cylindrical funnel 40 which forms a filtration chamber. The filtration chamber 130 and passages 57 above the annular frame 41 are separated by the filter paper 4.

The filtration chamber 130 contains the one or more beverage ingredients 200. The one or more beverage ingredients are packed into the filtration chamber 130. For a filtered style beverage the ingredient is typically roast and ground coffee or leaf tea. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm. Optionally, the interior 120 may contain one or more bodies, such as spheres, which are freely movable within the interior 120 to aid mixing by inducing turbulence and breaking down deposits of beverage ingredients during discharge of the beverage.

The laminate 5 is then affixed to the outer member 2 by forming a weld 126 around the periphery of the laminate 5 to join the laminate 5 to the lower surface of the outwardly extending flange 35. The weld 126 is extended to seal the laminate 5 against the lower edge of the cylindrical wall 27 of the inlet chamber 26. Further, a weld 125 is formed between the laminate 5 and the lower edge of the outer tube 42 of the cylindrical funnel 40. The laminate 5 forms the lower wall of the filtration chamber 130 and also seals the inlet chamber 26 and cylindrical funnel 40. However, a small gap 123 exists prior to dispensation between the laminate 5 and the lower edge of the discharge spout 43. A variety of welding methods may be used, such as heat and ultrasonic welding, depending on the material characteristics of the laminate 5.

Advantageously, the inner member 3 spans between the outer member 2 and the laminate 5. The inner member 3 is formed from a material of relative rigidity, such as polypropylene. As such, the inner member 3 forms a load-bearing member that acts to keep the laminate 5 and outer member 2 spaced apart when the cartridge 1 is compressed. It is preferred that the cartridge 1 is subjected to a compressive load of between 130 and 280 N in use. The compressive force acts to prevent the cartridge failing under internal pressurisation and also serves to squeeze the inner member 3 and outer member 2 together. This ensures that the internal dimensions of passageways and apertures in the cartridge 1 are fixed and unable to change during pressurisation of the cartridge 1.

To use the cartridge 1 it is first inserted into a beverage preparation machine and the inlet 121 and outlet 122 are opened by piercing members of the beverage preparation machine which perforate and fold back the laminate 5. An aqueous medium, typically water, under pressure enters the cartridge 1 through the inlet 121 into the inlet chamber 26 at a pressure of between 0.1-2.0 bar. From there the water is directed to flow through the slots 30 and round the manifold 16 and into the filtration chamber 130 of the cartridge 1 through the plurality of slots 17. The water is forced radially inwardly through the filtration chamber 130 and mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41. The sealing of the filter 4 onto the spokes 53 and the welding of the rim 51 with the outer member 2 ensures that there are no short-circuits and all the beverage has to pass through the filter 4.

The beverage then flows downwardly along the radial passages 57 formed between the webs 54 and through the openings 56 and into the cylindrical funnel 40. The beverage passes along the channels 50 between the support webs 47 and down the discharge spout 43 to the outlet 44 where the beverage is discharged into a receptacle such as a cup.

Preferably, the beverage preparation machine comprises an air purge facility, wherein compressed air is forced through the cartridge 1 at the end of the operating cycle to flush out the remaining beverage into the receptacle.

A second version of cartridge 1 will now be described for background purposes with reference to FIGS. 12 to 18. The second version of the cartridge 1 is particularly designed for use in dispensing espresso-style products such as roast and ground coffee where it is desirable to produce a beverage having a froth of tiny bubbles known as a crema. Many of the features of the second version of the cartridge 1 are the same as in the first version and like numerals have been used to reference like features. In the following description the differences between the first and second versions will be discussed. Common features which function in the same manner will not be discussed in detail.

The outer member 2 is of the same construction as in the first version of cartridge 1 and as shown in FIGS. 1 to 6.

Figure 16:
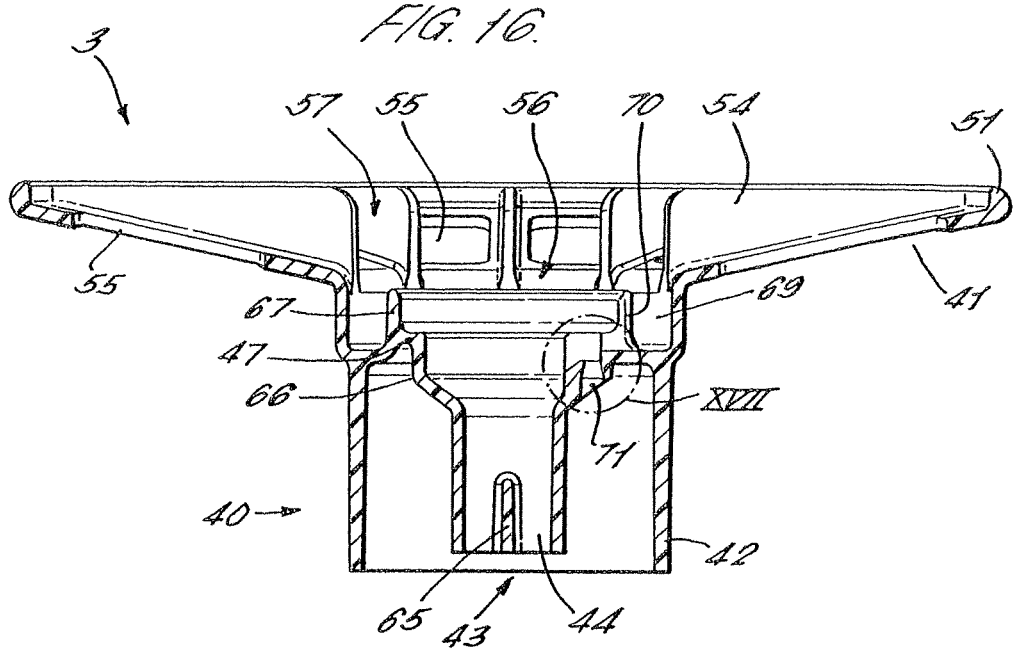
FIG. 16 is another cross-sectional drawing of the inner member of FIG. 12.

The annular frame 41 of the inner member 3 is the same as in the first version. Also, a filter 4 is disposed on the annular frame 41 so as to cover the filtration apertures 55. The outer tube 42 of the cylindrical funnel 40 is also as before. However, there are a number of differences in the construction of the inner member 2 of the second version compared to the first version. As shown in FIG. 16, the discharge spout 43 is provided with a partition 65 which extends part way up the discharge spout 43 from the outlet 44. The partition 65 helps to prevent the beverage spraying and/or splashing as it exits the discharge spout 43. The profile of the discharge spout 43 is also different and comprises a stepped profile with a distinct dog-leg 66 near an upper end of the tube 43.

A rim 67 is provided upstanding from the annular flange 47 joining the outer tube 42 to the discharge spout 43. The rim 67 surrounds the inlet 45 to the discharge spout 43 and defines an annular channel 69 between the rim 67 and the upper portion of the outer tube 42. The rim 67 is provided with an inwardly directed shoulder 68. At one point around the circumference of the rim 67 an aperture 70 is provided in the form of a slot which extends from an upper edge of rim 67 to a point marginally below the level of the shoulder 68 as most clearly shown in FIGS. 12 and 13. The slot has a width of 0.64 mm.

Figure 17:
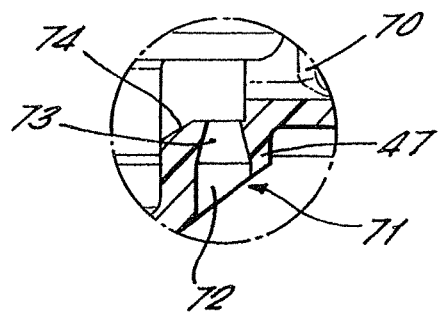
FIG. 17 is a cross-sectional drawing of another detail of the inner member of FIG. 12 showing an air inlet.

An air inlet 71 is provided in annular flange 47 circumferentially aligned with the aperture 70 as shown in FIGS. 16 and 17. The air inlet 71 comprises an aperture passing through the flange 47 so as to provide communication between a point above the flange 47 and the void space below the flange 47 between the outer tube 42 and discharge spout 43. Preferably, and as shown, the air inlet 71 comprises an upper frustoconical portion 73 and a lower cylindrical portion 72. The air inlet 71 is typically formed by a mould tool such as a pin. The tapered profile of the air inlet 71 allows the mould tool to be more easily removed from the moulded component. The wall of the outer tube 42 in the vicinity of the air inlet 71 is shaped to form a chute 75 leading from the air inlet 71 to the inlet 45 of the discharge spout 43. As shown in FIG. 17, a canted shoulder 74 is formed between the air inlet 71 and the chute 75 to ensure that the jet of beverage issuing from the slot 70 does not immediately foul on the upper surface of the flange 47 in the immediate vicinity of the air inlet 71.

Figure 18:
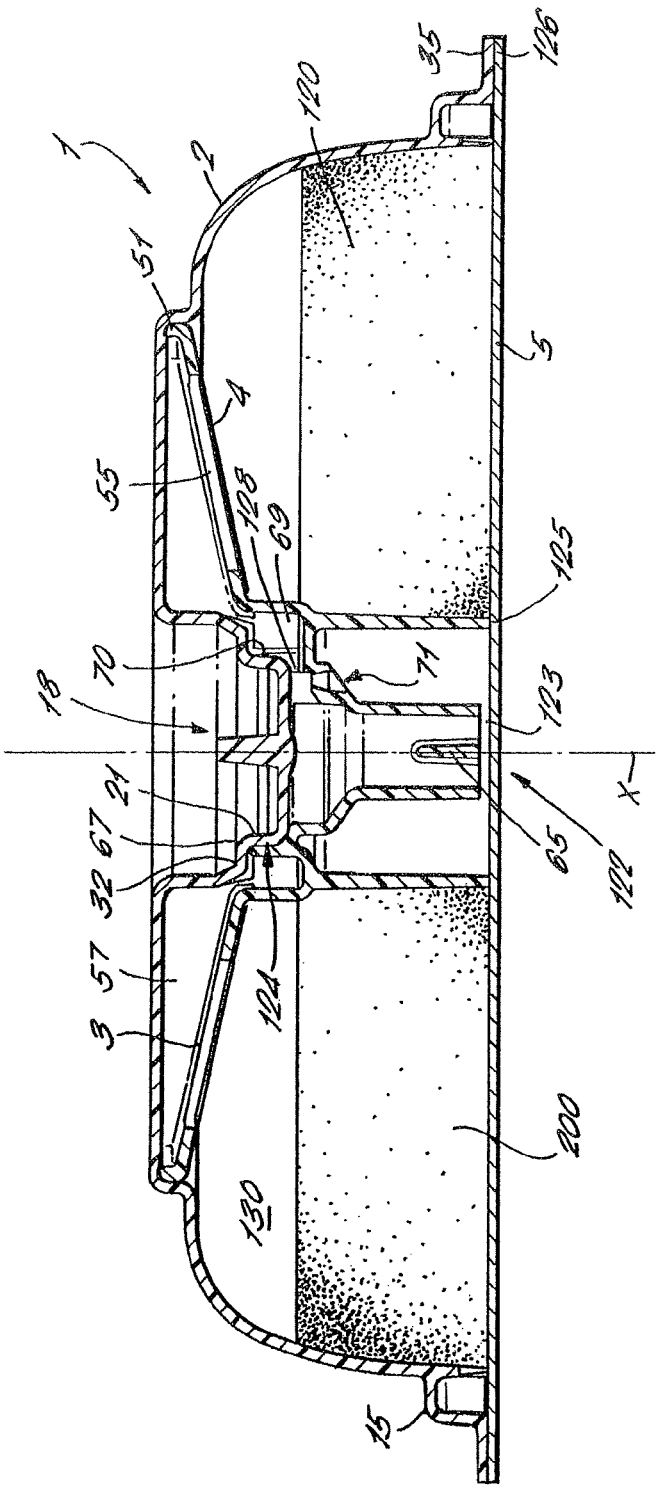
FIG. 18 is a cross-sectional drawing of the second embodiment of cartridge in an assembled condition.
Figure 19:
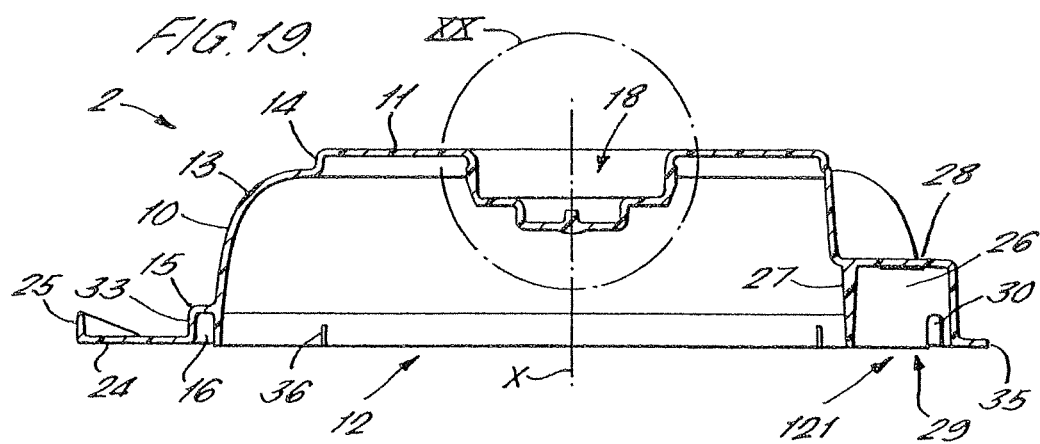
FIG. 19 is cross-sectional drawing of an outer member of third and fourth embodiments of cartridge according to the present invention.

The assembly procedure for the second version of cartridge 1 is similar to the assembly of the first version. However, there are certain differences. As shown in FIG. 18, the third portion 21 of the cylindrical extension 18 is seated inside the support rim 67 rather than against support webs. The shoulder 32 of the cylindrical extension 18 between the second portion 20 and third portion 21 bears against the upper edge of the support rim 67 of the inner member 3. An interface zone 124 is thus formed between the inner member 3 and the outer member 2 comprising a face seal between the cylindrical extension 18 and the support rim 67 which extends around nearly the whole circumference of the cartridge 1. The seal between the cylindrical extension 18 and the support rim 67 is not fluid-tight though since the slot 70 in the support rim 67 extends through the support rim 67 and downwardly to a point marginally below the shoulder 68. Consequently the interface fit between the cylindrical extension 18 and the support rim 67 transforms the slot 70 into an aperture 128, as most clearly shown in FIG. 18, providing gas and liquid communication between the annular channel 69 and the discharge spout 43. The aperture is typically 0.64 mm wide by 0.69 mm long.

Operation of the second version of cartridge 1 to dispense a beverage is similar to the operation of the first version but with certain differences. Beverage in the radial passages 57 flows downwardly along the passages 57 formed between the webs 54 and through the openings 56 and into the annular channel 69 of the cylindrical funnel 40. From the annular channel 69 the beverage is forced under pressure through the aperture 128 by the back pressure of beverage collecting in the filtration chamber 130 and passages 57. The beverage is thus forced through aperture 128 as a jet and into an expansion chamber formed by the upper end of the discharge spout 43. As shown in FIG. 18, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired crema. Thus, the aperture 128 and the air inlet 71 together form an eductor which acts to entrain air into the beverage. Flow of beverage into the eductor should be kept as smooth as possible to reduce pressure losses. Advantageously, the walls of the eductor should be made concave to reduce losses due to 'wall effect' friction. The dimensional tolerance of the aperture 128 is small. Preferably the aperture size is fixed plus or minus 0.02 mm$^2$. Hairs, fibrils or other surface irregularities can be provided within or at the exit of the eductor to increase the effective cross-sectional area which has been found to increase the degree of air entrainment.

A third version of cartridge 1 according to the present invention is shown in FIGS. 19 to 29. The third version of the cartridge 1 is particularly designed for use in dispensing soluble products which may be in powdered, liquid, syrup, gel or similar form. The soluble product is dissolved by or forms a suspension in, an aqueous medium such as water when the aqueous medium is passed, in use, through the cartridge 1. Examples of beverages include cocoa solids, coffee, milk, tea, soup or other rehydratable or aqueous-soluble products. Many of the features of the third version of the cartridge 1 are the same as in the previous versions and like numerals have been used to reference like features. In the following description the differences between the third and previous versions will be discussed. Common features which function in the same manner will not be discussed in detail.

Figure 20:
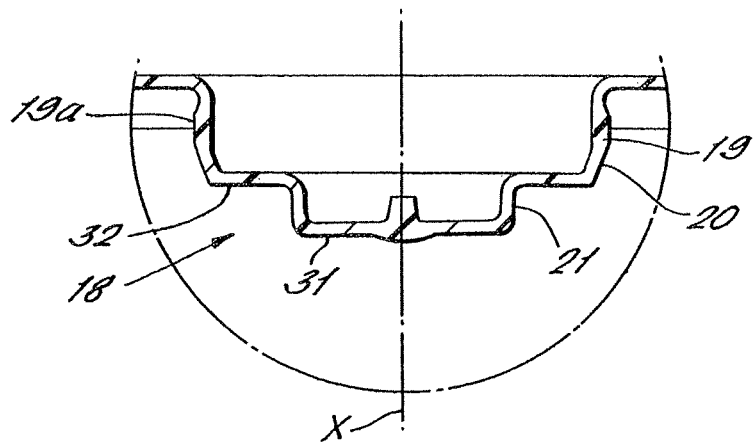
FIG. 20 is a cross-sectional drawing of a detail of the outer member of FIG. 19 showing an inwardly directed cylindrical extension.

Compared to the outer member 2 of the previous versions, the hollow inwardly directed cylindrical extension 18 of the outer member 2 of the third version has a larger overall diameter as shown in FIG. 20. In particular the diameter of the first portion 19 is typically between 16 and 18 mm compared to 13.2 mm for the outer member 2 of the previous versions. In addition, the first portion 19 is provided with a convex outer surface 19a, or bulge, as most clearly shown in FIG. 20, the function of which will be described below. The diameter of the third portions 21 of the cartridges 1 are however the same resulting in the area of the shoulder 32 being greater in this, the third version of the cartridge 1. Typically the volume of the cartridge 1 when assembled is 32.5 ml±20%.

The number and positioning of the slots in the lower end of the annular wall 13 is also different. Between 3 and 5 slots are provided. In the embodiment as shown in FIG. 23, four slots 36 are provided equi-spaced around the circumference of the manifold 16. The slots 36 are slightly wider than in the previous versions of the cartridge 1 being between 0.35 and 0.45 mm, preferably 0.4 mm wide.

In other respects the outer members 2 of the cartridges 1 are the same.

The construction of the cylindrical funnel 40 of the inner member 3 is the same as in the first version of cartridge 1 with an outer tube 42, discharge spout 45, annular flange 47 and support webs 49 being provided. The only difference is that the discharge spout 45 is shaped with an upper frusto-conical section 92 and a lower cylindrical section 93.

In contrast to the previous versions and as shown in FIGS. 24 to 28, the annular frame 41 is replaced by a skirt portion 80 which surrounds the cylindrical funnel 40 and is joined thereto by means of eight radial struts 87 which adjoin the cylindrical funnel 40 at or near the annular flange 47. A cylindrical extension 81 of the skirt portion 80 extends upwardly from the struts 87 to define a chamber 90 with an open upper face. An upper rim 91 of the cylindrical extension 81 has an in-turned profile as shown in FIG. 26. An annular wall 82 of the skirt portion 80 extends downwardly from the struts 87 to define an annular channel 86 between the skirt portion 80 and the outer tube 42.

The annular wall 82 comprises at a lower end an exterior flange 83 which lies perpendicular to the major axis X. A rim 84 depends downwardly from a lower surface of the flange 83 and contains five apertures 85 which are circumferentially equi-spaced around the rim 84. Thus, the rim 84 is provided with a castellated lower profile.

Apertures 89 are provided between the struts 87 allowing communication between the chamber 90 and the annular channel 86.

Figure 29:
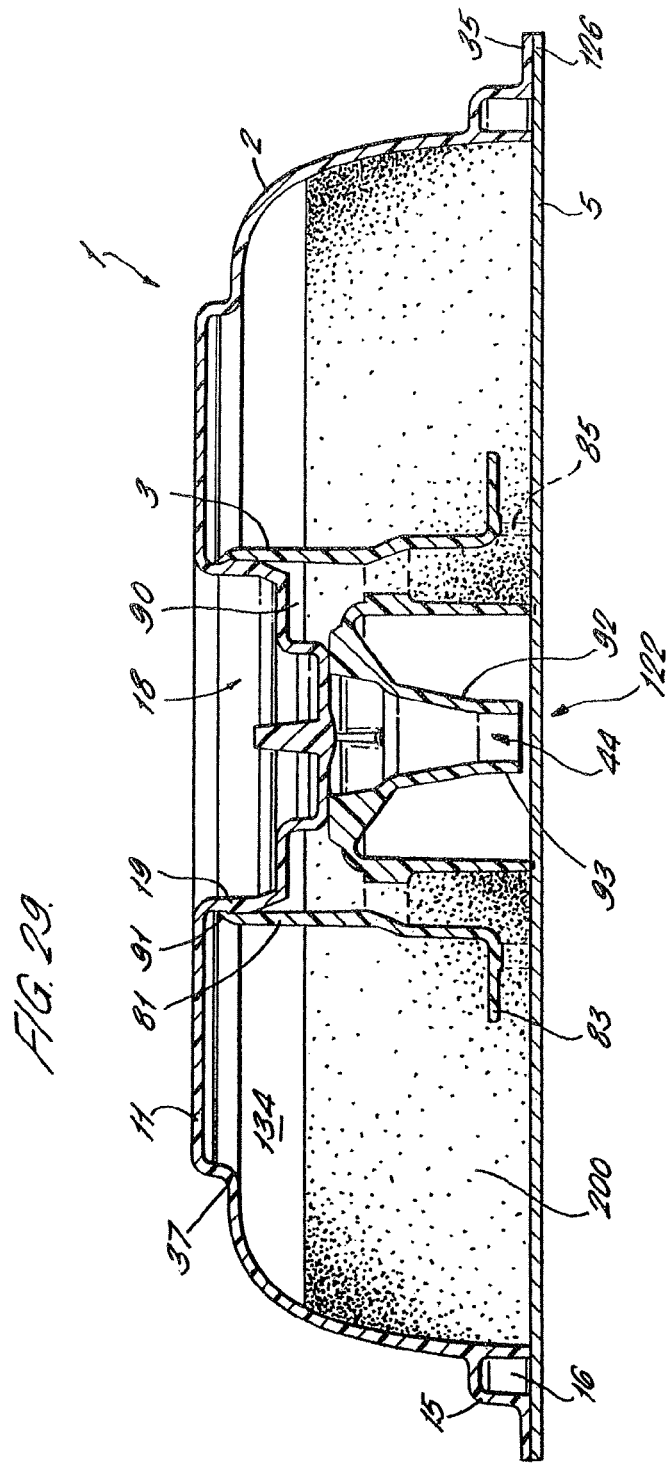
FIG. 29 is a cross-sectional drawing of the third embodiment of cartridge in an assembled condition.

The assembly procedure for the third version of cartridge 1 is similar to the assembly of the first version but with certain differences. The outer member 2 and inner member 3 are push-fitted together as shown in FIG. 29 and retained by means of a snap-fit arrangement rather than welded together. On joining the two members the inwardly directed cylindrical extension 18 is received inside the upper cylindrical extension 81 of the skirt portion 80. The inner member 3 is retained in the outer member 2 by frictional interengagement of the convex outer surface 19a of the first portion 19 of the cylindrical extension 18 with the in-turned rim 91 of the upper cylindrical extension 81. With the inner member 3 located in the outer member 2 a mixing chamber 134 is defined located exterior to the skirt portion 80. The mixing chamber 134 contains the beverage ingredients 200 prior to dispensation. It should be noted that the four inlets 36 and the five apertures 85 are staggered circumferentially with respect to one another. The radial location of the two parts relative to each other need not be determined or fixed during assembly since the use of four inlets 36 and five apertures 85 ensures that misalignment occurs between the inlets and apertures whatever the relative rotational positioning of the components.

The one or more beverage ingredients are packed into the mixing chamber 134 of the cartridge. The density of packing of the beverage ingredients in the mixing chamber 134 can be varied as desired.

The laminate 5 is then affixed to the outer member 2 and inner member 3 in the same manner as described above in the previous versions.

In use, water enters the mixing chamber 134 through the four slots 36 in the same manner as previous versions of the cartridge. The water is forced radially inwardly through the mixing chamber and mixes with the beverage ingredients contained therein. The product is dissolved or mixed in the water and forms the beverage in the mixing chamber 134 and is then driven though the apertures 85 into the annular channel 86 by back pressure of beverage and water in the mixing chamber 134. The circumferential staggering of the four inlet slots 36 and the five apertures 85 ensures that jets of water are not able to pass radially directly from the inlet slots 36 to the apertures 85 without first circulating within the mixing chamber 134. In this way the degree and consistency of dissolution or mixing of the product is significantly increased. The beverage is forced upwardly in the annular channel 86, through the apertures 89 between the struts 87 and into the chamber 90. The beverage passes from chamber 90 through the inlets 45 between the support webs 49 into the discharge spout 43 and towards the outlet 44 where the beverage is discharged into a receptacle such as a cup. The cartridge finds particular application with beverage ingredients in the form of viscous liquids or gels. In one application a liquid chocolate ingredient is contained in the cartridge 1 with a viscosity of between 1700 and 3900 mPa at ambient temperature and between 5000 and 10000 mPa at 0° C. and a refractive solids of 67 Brix±3. In another application liquid coffee is contained in the cartridge 1 with a viscosity of between 70 and 2000 mPa at ambient and between 80 and 5000 mPa at 0° C. where the coffee has a total solids level of between 40 and 70%. The liquid coffee ingredient may contain between 0.1 and 2.0% by weight sodium bicarbonate, preferably between 0.5 and 1.0% by weight. The sodium bicarbonate acts to maintain the pH level of the coffee at or below 4.8 enabling a shelf-life for coffee-filled cartridges of up to 12 months.

A fourth version of cartridge 1 embodying the present invention is shown in FIGS. 30 to 34. The fourth version of the cartridge 1 is particularly designed for use in dispensing liquid products such as concentrated liquid milk. Many of the features of the fourth version of the cartridge 1 are the same as in the previous versions and like numerals have been used to reference like features. In the following description the differences between the fourth and previous versions will be discussed. Common features which function in the same manner will not be discussed in detail.

The outer member 2 is the same as in the third version of cartridge 1 and as shown in FIGS. 19 to 23.

The cylindrical funnel 40 of the inner member 3 is similar to that shown in the second version of cartridge 1 but with certain differences. As shown in FIG. 30 the discharge spout 43 is shaped with an upper frusto-conical section 106 and a lower cylindrical section 107. Three axial ribs 105 are provided on the inner surface of the discharge spout 43 to direct the dispensed beverage downwards towards the outlet 44 and prevent the discharged beverage from spinning within the spout. Consequently, the ribs 105 act as baffles. As in the second version of cartridge 1, an air inlet 71 is provided through the annular flange 47. However, the chute 75 beneath the air inlet 71 is more elongated than in the second version.

A skirt portion 80 is provided similar to that shown in the third version of the cartridge 1 described above. Between 5 and 12 apertures 85 are provided in the rim 84. Typically ten apertures are provided rather than the five provided in the third version of cartridge 1.

An annular bowl 100 is provided extending from and integral with the flange 83 of the skirt portion 80. The annular bowl 100 comprises a flared body 101 with an open upper mouth 104 which is directed upwards. Four feed apertures 103 shown in FIGS. 30 and 31 are located in the body 101 at or near the lower end of the bowl 100 where it joins the skirt portion 80. Preferably, the feed apertures are equi-spaced around the circumference of the bowl 100.

The laminate 5 is of the type described above in the previous embodiments.

The assembly procedure for the fourth version of cartridge 1 is the same as that for the third version.

Figure 34:
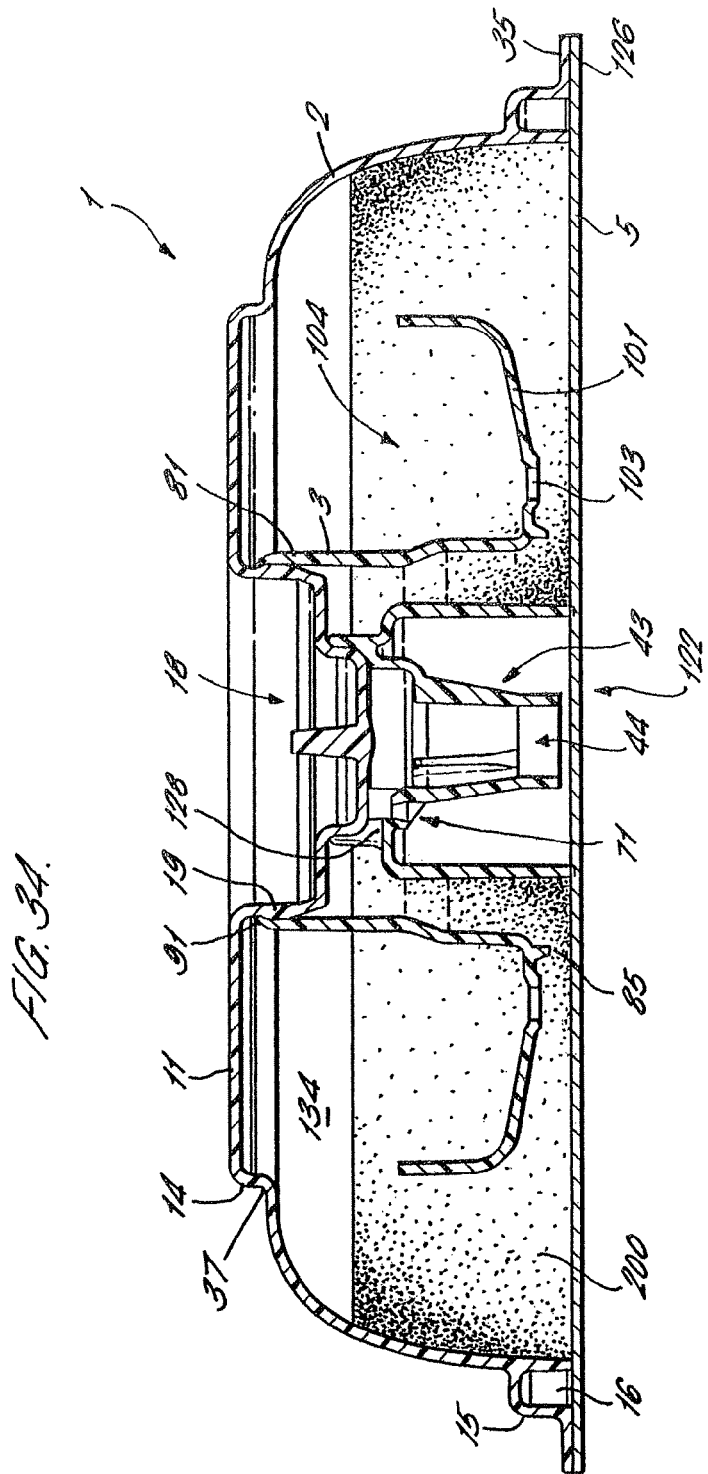
FIG. 34 is a cross-sectional drawing of the fourth embodiment of cartridge in an assembled condition.
Figure 35A:
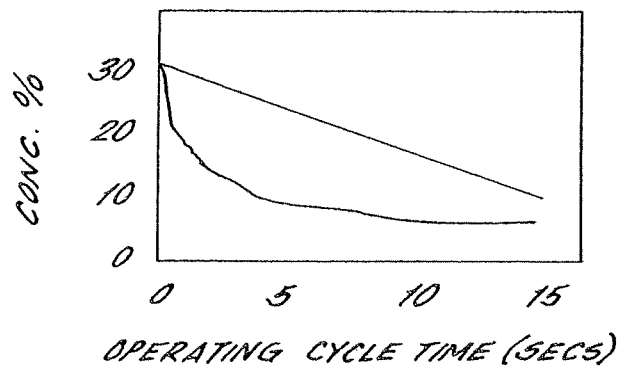
FIG. 35a is a graph of concentration vs. operating cycle time.

Operation of the fourth version of cartridge is similar to that of the third version. The water enters the cartridge 1 and the mixing chamber 134 in the same manner as before. There the water mixes with and dilutes the liquid product which is then forced out below the bowl 100 and through the apertures 85 towards the outlet 44 as described above. The proportion of the liquid product initially contained within the annular bowl 100 as shown in FIG. 34 is not subject to immediate dilution by the water entering the mixing chamber 134. Rather, the diluted liquid product in the lower part of the mixing chamber 134 will tend to exit through apertures 85 rather than be forced up and into the annular bowl 100 through upper mouth 104. Consequently, the liquid product in the annular bowl 100 will remain relatively concentrated during the initial stages of the operating cycle compared to the product in the lower part of the mixing chamber 134. The liquid product in the annular bowl 100 drips through the feed apertures 103 under gravity into the stream of product exiting the mixing chamber 134 through the apertures 85 and below the bowl 100. The annular bowl 100 acts to even out the concentration of the diluted liquid product entering the cylindrical funnel 40 by holding back a proportion of the concentrated liquid product and releasing it into the exiting liquid stream flow path steadily throughout the operating cycle as illustrated in FIG. 35a where the concentration of the milk measured as a percentage of the total solids present is shown during an operating cycle of approximately 15 seconds. Line a illustrates the concentration profile with the bowl 100 whilst line b illustrates a cartridge without the bowl 100. As can be seen the concentration profile with the cup 100 is more even during the operating cycle and there is no immediate large drop in concentration as occurs without the bowl 100. The initial concentration of the milk is typically 30-35% SS and at the end of the cycle 10% SS. This results in a dilution ratio of around 3 to 1, although dilution ratios of between 1 to 1 and 6 to 1 are possible with the present invention. For other liquid beverage ingredients the concentrations may vary. For example for liquid chocolate the initial concentration is approximately 67% SS and at the end of the cycle 12-15% SS. This results in a dilution ratio (ratio of aqueous medium to beverage ingredient in dispensed beverage) of around 5 to 1, although dilution ratios of between 2 to 1 and 10 to 1 are possible with the present invention. For liquid coffee the initial concentration is between 40-67% and the concentration at the end of dispense 1-2% SS. This results in a dilution ratio of between 20 to 1 and 70 to 1, although dilution ratios of between 10 to 1 and 100 to 1 are possible with the present invention.

From the annular channel 86 the beverage is forced under pressure through the aperture 128 by the back pressure of beverage collecting in the filtration chamber 134 and chamber 90. The beverage is thus forced through aperture 128 as a jet and into an expansion chamber formed by the upper end of the discharge spout 43. As shown in FIG. 34, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired frothy appearance.

Advantageously, the inner member 3, outer member 2, laminate 5 and filter 4 can all be readily sterilised due to the components being separable and not individually comprising tortuous passageways or narrow crevices. Rather, it is only after conjoining the components, after sterilisation, that the necessary passageways are formed. This is particularly important where the beverage ingredient is a dairy-based product such as liquid milk concentrate.

The fourth embodiment of beverage cartridge is particularly advantageous for dispensing a concentrated dairy-based liquid product such as liquid milk. Previously, powdered milk products have been provided in the form of sachets for adding to a pre-prepared beverage. However, for a cappuccino-style beverage it is necessary to foam the milk. This has been achieved previously by passing steam through a liquid milk product. However this necessitates the provision of a steam supply which increases the cost and complexity of the machine used to dispense the beverage. The use of steam also increases the risk of injury during operation of the cartridge. Accordingly the present invention provides for a beverage cartridge having a concentrated dairy-based liquid product therein. It has been found that by concentrating the milk product a greater amount of foam can be produced for a particular volume of milk when compared to fresh or UHT milk. This reduces the size required for the milk cartridge. Fresh semi-skimmed milk contains approximately 1.6% fat and 10% total solids. The concentrated liquid milk preparations of the present invention contain between 0.1 and 12% fat and 25 to 40% total solids. In a typical example, the preparation contains 4% fat and 30% total solids. The concentrated milk preparations are suitable for foaming using a low pressure preparation machine as will be described below. In particular, foaming of the milk is achieved at pressures below 2 bar, preferably approximately 1.5 bar using the cartridge of the fourth embodiment described above.

Figure 35B:
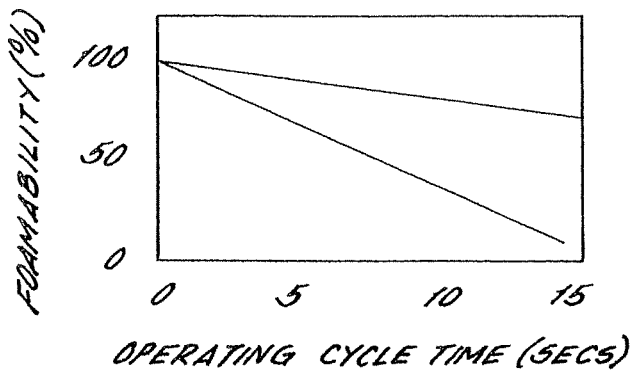
FIG. 35b is a graph of foamability vs. operating cycle time.
Figure 35C:
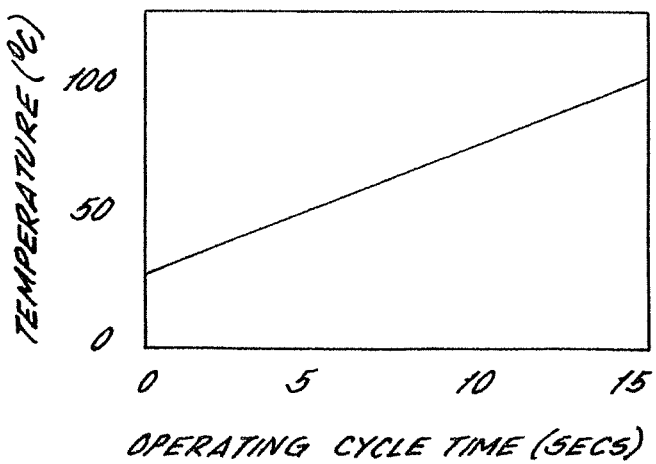
FIG. 35c is a graph of temperature vs. operating cycle time.

The foaming of the concentrated milk is particularly advantageous for beverages such as cappuccinos and milk shakes. Preferably the passing of the milk through the aperture 128 and over the air inlet 71 and the optional use of the bowl 100 enables foaming levels of greater than 40%, preferably greater than 70% for milk. For liquid chocolate foaming levels of greater than 70% are possible. For liquid coffee foaming levels of greater than 70% are possible. The foamability level is measured as the ratio of the volume of the foam produced to the volume of liquid beverage ingredient dispensed. For example, where 138.3 ml of beverage is dispensed, of which 58.3 ml is foam the foamability is measured as [58.3/(138.3−58.3)]*100=72.9%. The foamability of the milk (and other liquid ingredients) is enhanced by the provision of the bowl 100 as can be seen in FIG. 35b. The foamability of the milk dispensed with the bowl 100 present (line a) is greater than that of milk dispensed without the bowl present (line b). This is because the foamability of the milk is positively correlated to the concentration of the milk and as shown in FIG. 35a the bowl 100 maintains a higher concentration of the milk a larger part of the operating cycle. It is also known that foamability of the milk is positively correlated to temperature of the aqueous medium as shown in FIG. 35c. Thus the bowl 100 is advantageous since more of the milk remains in the cartridge until near the end of the operating cycle when the aqueous medium is at its hottest. This again improves foamability.

The cartridge of the fourth embodiment is also advantageous in dispensing liquid coffee products as described above.

It has been found that the embodiments of beverage cartridge of the present invention advantageously provide an improved consistency of the dispensed beverage when compared to prior art cartridges. Reference is made to Table 1 below which shows the results of brew yields for twenty samples each of cartridges A and B containing roast and ground coffee. Cartridge A is a beverage cartridge according to the first embodiment of the present invention. Cartridge B is a prior art beverage cartridge as described in the applicant's document WO 01/58786. The refractive index of the brewed beverage is measured in Brix units and converted to a percentage of soluble solids (% SS) using standard tables and formulae. In the examples below:

% SS=0.7774*(Brix value)+0.0569.

% Yield=(% SS*Brew Volume (g))/(100*Coffee Weight (g))

TABLE 1

| Sample | Brew Volume (g) | Coffee Weight (g) | Brix | % SS (*) | % Yield |
|---|---|---|---|---|---|
| CARTRIDGE A | | | | | |
| 1 | 105.6 | 6.5 | 1.58 | 1.29 | 20.88 |
| 2 | 104.24 | 6.5 | 1.64 | 1.33 | 21.36 |
| 3 | 100.95 | 6.5 | 1.67 | 1.36 | 21.05 |
| 4 | 102.23 | 6.5 | 1.71 | 1.39 | 21.80 |
| 5 | 100.49 | 6.5 | 1.73 | 1.40 | 21.67 |
| 6 | 107.54 | 6.5 | 1.59 | 1.29 | 21.39 |
| 7 | 102.70 | 6.5 | 1.67 | 1.36 | 21.41 |
| 8 | 97.77 | 6.5 | 1.86 | 1.50 | 22.61 |
| 9 | 97.82 | 6.5 | 1.7 | 1.38 | 20.75 |
| 10 | 97.83 | 6.5 | 1.67 | 1.36 | 20.40 |
| 11 | 97.6 | 6.5 | 1.78 | 1.44 | 21.63 |
| 12 | 106.64 | 6.5 | 1.61 | 1.31 | 21.47 |
| 13 | 99.26 | 6.5 | 1.54 | 1.25 | 19.15 |
| 14 | 97.29 | 6.5 | 1.59 | 1.29 | 19.35 |
| 15 | 101.54 | 6.5 | 1.51 | 1.23 | 19.23 |
| 16 | 104.23 | 6.5 | 1.61 | 1.31 | 20.98 |
| 17 | 97.5 | 6.5 | 1.73 | 1.40 | 21.03 |
| 18 | 100.83 | 6.5 | 1.68 | 1.36 | 21.14 |
| 19 | 101.67 | 6.5 | 1.67 | 1.36 | 21.20 |
| 20 | 101.32 | 6.5 | 1.68 | 1.36 | 21.24 |
| | | | | AVERAGE | 20.99 |
| CARTRIDGE B | | | | | |
| 1 | 100.65 | 6.5 | 1.87 | 1.511 | 23.39 |
| 2 | 95.85 | 6.5 | 1.86 | 1.503 | 22.16 |
| 3 | 98.4 | 6.5 | 1.8 | 1.456 | 22.04 |
| 4 | 92.43 | 6.5 | 2.3 | 1.845 | 26.23 |
| 5 | 100.26 | 6.5 | 1.72 | 1.394 | 21.50 |
| 6 | 98.05 | 6.5 | 2.05 | 1.651 | 24.90 |
| 7 | 99.49 | 6.5 | 1.96 | 1.581 | 24.19 |
| 8 | 95.62 | 6.5 | 2.3 | 1.845 | 27.14 |
| 9 | 94.28 | 6.5 | 2.17 | 1.744 | 25.29 |

TABLE 1-continued

| Sample | Brew Volume (g) | Coffee Weight (g) | Brix | % SS (*) | % Yield |
|---|---|---|---|---|---|
| 10 | 96.13 | 6.5 | 1.72 | 1.394 | 20.62 |
| 11 | 96.86 | 6.5 | 1.81 | 1.464 | 21.82 |
| 12 | 94.03 | 6.5 | 2.2 | 1.767 | 25.56 |
| 13 | 96.28 | 6.5 | 1.78 | 1.441 | 21.34 |
| 14 | 95.85 | 6.5 | 1.95 | 1.573 | 23.19 |
| 15 | 95.36 | 6.5 | 1.88 | 1.518 | 22.28 |
| 16 | 92.73 | 6.5 | 1.89 | 1.526 | 21.77 |
| 17 | 88 | 6.5 | 1.59 | 1.293 | 17.50 |
| 18 | 93.5 | 6.5 | 2.08 | 1.674 | 24.08 |
| 19 | 100.88 | 6.5 | 1.75 | 1.417 | 22.00 |
| 20 | 84.77 | 6.5 | 2.37 | 1.899 | 24.77 |
|  |  |  |  | AVERAGE | 23.09 |

Performing a t-test statistical analysis on the above data gives the following results:

TABLE 2 t-Test: Two-Sample Assuming Equal Variances

|  | % Yield (Cartridge A) | % Yield (Cartridge B) |
|---|---|---|
| Mean | 20.99 | 23.09 |
| Variance | 0.77 | 5.04 |
| Observations | 20 | 20 |
| Pooled Variance | 2.90 |  |
| Hypothesized Mean Variance | 0 |  |
| df | 38 |  |
| t Stat | −3.90 |  |
| P(T <= t) one-tail | 0.000188 |  |
| t Critical one-tail | 1.686 |  |
| P(T <= t) two-tail | 0.000376 |  |
| t Critical two-tail | 2.0244 |  |
| Standard Deviation | 0.876 | 2.245 |

The analysis shows that the consistency of % yield, which equates to brew strength, for the cartridges of the present invention is significantly better (at a 95% confidence level) than the prior art cartridges, with a standard deviation of 0.88% compared to 2.24%. This means that beverages dispensed with the cartridges of the present invention have a more repeatable and uniform strength. This is preferred by consumers who like their drinks to taste the same time after time and do not want arbitrary changes in drink strength.

The materials of the cartridges described above may be provided with a barrier coating to improve their resistance to oxygen and/or moisture and/or other contaminant ingress. The barrier coating may also improve the resistance to leakage of the beverage ingredients from within the cartridges and/or reduce the degree of leaching of extractibles from the cartridge materials which might adversely affect the beverage ingredients. The barrier coating may be of a material selected from the group of PET, Polyamide, EVOH, PVDC or a metallised material. The barrier coating may be applied by a number of mechanisms including but not limited to vapour deposition, vacuum deposition, plasma coating, co-extrusion, in-mould labelling and two/multi-stage moulding.

What is claimed is:

1. A cartridge containing one or more beverage ingredients and being formed from substantially air- and water-impermeable materials, the cartridge comprising:
   an outer shell having a generally circular sidewall and a rim, the rim bounding an opening and the sidewall extending from the rim to a bottom wall, the outer shell having a central axis and a radius extending between the sidewall and the central axis;
   a storage chamber containing the one or more beverage ingredients;
   an inlet chamber for the introduction of an aqueous medium into the cartridge, the inlet chamber being separated from the storage chamber by a partition, the partition permitting flow of the aqueous medium from the inlet chamber into the storage chamber and restricting passage of the one or more beverage ingredients from the storage chamber into the inlet chamber;
   an outlet chamber separated from the storage chamber by a filter and including a first portion disposed between the filter and the bottom wall of the outer shell for permitting flow of beverage formed from interaction of the aqueous medium and the one or more beverage ingredients in the storage chamber from the storage chamber into the outlet chamber in a direction toward the bottom wall of the outer shell and a second portion permitting flow of the aqueous medium in a direction toward the opening of the outer shell; and
   a lid attached to the rim of the outer shell and closing the opening of the outer shell, the lid at least partially bounding the storage chamber, the inlet chamber, and the outlet chamber, the lid being pierceable in use to accommodate an inflow of the aqueous medium into the inlet chamber, and the lid being pierceable in use to accommodate an outflow of the beverage from the second portion of the outlet chamber.

2. The cartridge of claim 1 wherein the rim of the outer shell includes a generally circular flange with an enlarged, protruding portion extending outward from the generally circular flange.

3. The cartridge of claim 1 wherein the sidewall of the outer shell tapers radially inward as the sidewall extends from the rim to the bottom wall.

4. The cartridge of claim 1 wherein the filter includes a frustoconical portion extending about and along the central axis of the outer shell.

5. The cartridge of claim 1 wherein the lid has a pierceable inlet portion disposed adjacent the inlet chamber and a pierceable outlet portion disposed adjacent the outlet chamber with the pierceable inlet and outlet portions being spaced from each other along the lid.

6. The cartridge of claim 1 wherein the partition comprises a plurality of apertures configured to direct the aqueous medium along a plurality of flow paths into the storage chamber.

7. The cartridge of claim 1 wherein the partition is sealed to the lid.

8. The cartridge of claim 1 wherein the second portion of outlet chamber has an outlet opening through which the beverage is discharged and the lid overlies the outlet opening.

9. The cartridge of claim 1 wherein the generally circular sidewall includes a protuberance between the rim and the bottom wall of the outer shell extending radially outward relative to the immediately adjacent regions of the sidewall, wherein the protuberance has an outer curved wall portion.

10. The cartridge of claim 9 wherein, in use, an opening of the lid formed by piercing the lid is adjacent the protuberance.

* * * * *